(12) United States Patent
Alliss

(10) Patent No.: US 8,307,558 B2
(45) Date of Patent: Nov. 13, 2012

(54) LINE HOLDING SYSTEM FOR FIXED LINE TRIMMER HEAD

(76) Inventor: George E. Alliss, Lumberton, NC (US)

( * ) Notice: Subject to any disclaimer, the term of this patent is extended or adjusted under 35 U.S.C. 154(b) by 459 days.

(21) Appl. No.: 11/811,172

(22) Filed: Jun. 8, 2007

(65) Prior Publication Data

US 2008/0083120 A1 Apr. 10, 2008

Related U.S. Application Data

(60) Provisional application No. 60/812,098, filed on Jun. 9, 2006.

(51) Int. Cl.
*A01D 34/416* (2006.01)

(52) U.S. Cl. .............................. 30/276; 30/347; 56/12.7

(58) Field of Classification Search .................... 30/347, 30/276; 56/12.1, 12.7, 295
See application file for complete search history.

(56) References Cited

U.S. PATENT DOCUMENTS

| | | | |
|---|---|---|---|
| 4,062,114 A | 12/1977 | Luick | |
| 5,758,424 A | 6/1998 | Iacona et al. | |
| 5,887,348 A | 3/1999 | Iacona et al. | |
| 5,896,666 A | 4/1999 | Iacona et al. | |
| 6,347,455 B2 | 2/2002 | Brant et al. | |
| 6,519,857 B1 | 2/2003 | Proulx et al. | |
| 6,581,292 B2 | 6/2003 | Allis | |
| 6,854,185 B1 | 2/2005 | Alliss | |
| 6,928,741 B2 | 8/2005 | Proulx et al. | |
| 6,944,956 B1 | 9/2005 | Fogle | |
| 7,000,324 B2 * | 2/2006 | Fogle | ............... 30/276 |
| 7,111,403 B2 | 9/2006 | Moore | |
| 2004/0237315 A1 * | 12/2004 | Alliss | ............... 30/276 |
| 2005/0229402 A1 | 10/2005 | Iacona | |
| 2005/0252009 A1 | 11/2005 | Alliss | |
| 2006/0026846 A1 | 2/2006 | Alliss | |
| 2006/0048395 A1 * | 3/2006 | Legrand | ............ 30/276 |
| 2007/0084061 A1 | 4/2007 | Bennett | |

FOREIGN PATENT DOCUMENTS

JP 55-36973 * 8/1980

OTHER PUBLICATIONS

The definition of the term "along".*

* cited by examiner

*Primary Examiner* — Phong Nguyen
(74) *Attorney, Agent, or Firm* — LaMorte & Associates, P.C.

(57) ABSTRACT

In an embodiment, at least one pair cleats is provided. The two cleats of each pair are symmetrically arranged about a passageway for trimmer line. The two cleats of each pair allow trimmer line to be inserted through an entrance port with relatively little (if any) hindrance. However, the cleats grip the trimmer line preventing the trimmer line from being removed via the entrance port when the trimmer line is pulled from the entrance port (e.g., during use).

In an embodiment, a trimmer head is provided with an exit port on the top of the trimmer head, which is for removing trimmer line by pulling the trimmer line through the exit port. The trimmer head uses a fixed length of trimmer line, which may be loaded with new trimmer line by inserting the trimmer line into an entrance port until one end of the trimmer line reaches the exit port.

13 Claims, 19 Drawing Sheets

LINE HOLDING SYSTEM FOR FIXED LINE TRIMMER HEAD

CROSS-REFERENCE TO RELATED APPLICATIONS

This application claims priority benefit of U.S. Provisional Patent Application No. 60/812,098, entitled, "IMPROVED LINE HOLDING. SYSTEM FOR FIXED LINE TRIMMER HEAD," filed Jun. 9, 2006 by George E. Alliss, which is incorporated herein by reference.

FIELD

The present invention is related to rotary trimmers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Flexible line rotary trimmers are commonly used for cutting vegetation such as grass and weeds, particularly along walks, fences, flower beds, and around trees. These devices may include a rotary driven head that carries one or more lengths of monofilament line mounted within a housing. Extended end portions of each trimmer line projects from each of the housings through guides in the side wall of the housing. As the head rotates at high speeds, the end portion of each of the lines is caused to project outwardly from the housing by the centrifugal forces acting thereon and function as cutting blades. When the cutting line projecting from the head breaks or becomes overly worn, fresh line must be extended from the head and the old line severed and discarded.

Several attempts have been made to provide a more user-friendly rotary cutting head. Such heads typically employ one or more short lengths of a line which are anchored within the head in lieu of the long lengths of line that are wrapped about an interior spool. These heads are frequently referred to as "fixed line cutting heads." The terms trimmer head and cutting head may be interchanged anywhere they occur in the specification. Similarly the terms trimmer line and cutting line may be interchanged anywhere they appear in the specification.

Although fixed line cutting heads have eliminated the need to carefully wrap a long length of line about the spool, many such heads still require disassembly and reassembly of trimmer head housing parts to replace worn or broken line. In some of these fixed line cutting heads, removal of the worn trimmer line to replace the worn or torn trimmer line with a new fixed length of line can be difficult because the line is "jammed or wedged" so tightly that a tool may be needed and required to aide in unjamming the line to be able to remove it from the trimmer head.

A fixed line head that does not require disassembly to effect line replacement is found in U.S. Pat. No. 4,062,114, issued to Luick and entitled "Vegetation Cutting Apparatus." The cutting heads disclosed therein are provided with one of several differently configured channels terminating in a reduced diameter portion proximate the side wall of the head. A short length of flexible cutting line extends through the channel and extends radially from the head. The trimmer line is held in place by an enlarged member secured to the inner end of the length of cutting line which is translatable along the channel but cannot pass through the reduced diameter portion thereof. While such a head and line configuration provides for relatively simple line replacement, each length of replacement line must be provided with a suitable enlarged member at one end thereof, significantly increasing the cost of operation. In addition, if the cutting line were to break at the eyelet or outlet end of the line channel, line removal may be difficult.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-12 is a brief description of each element, which may have no more than the name of each of the elements in the one of FIGS. 1-12 that is being discussed. After the brief description of each element, each element is further discussed in numerical order. In general, each of FIGS. 1-14 is discussed in numerical order and the elements within FIGS. 1-14 are also usually discussed in numerical order to facilitate easily locating the discussion of a particular element. Nonetheless, there is no one location where all of the information of any element of FIGS. 1-14 is necessarily located. Unique information about any particular element or any other aspect of any of FIGS. 1-14 may be found in, or implied by, any part of the specification.

Figure 1:
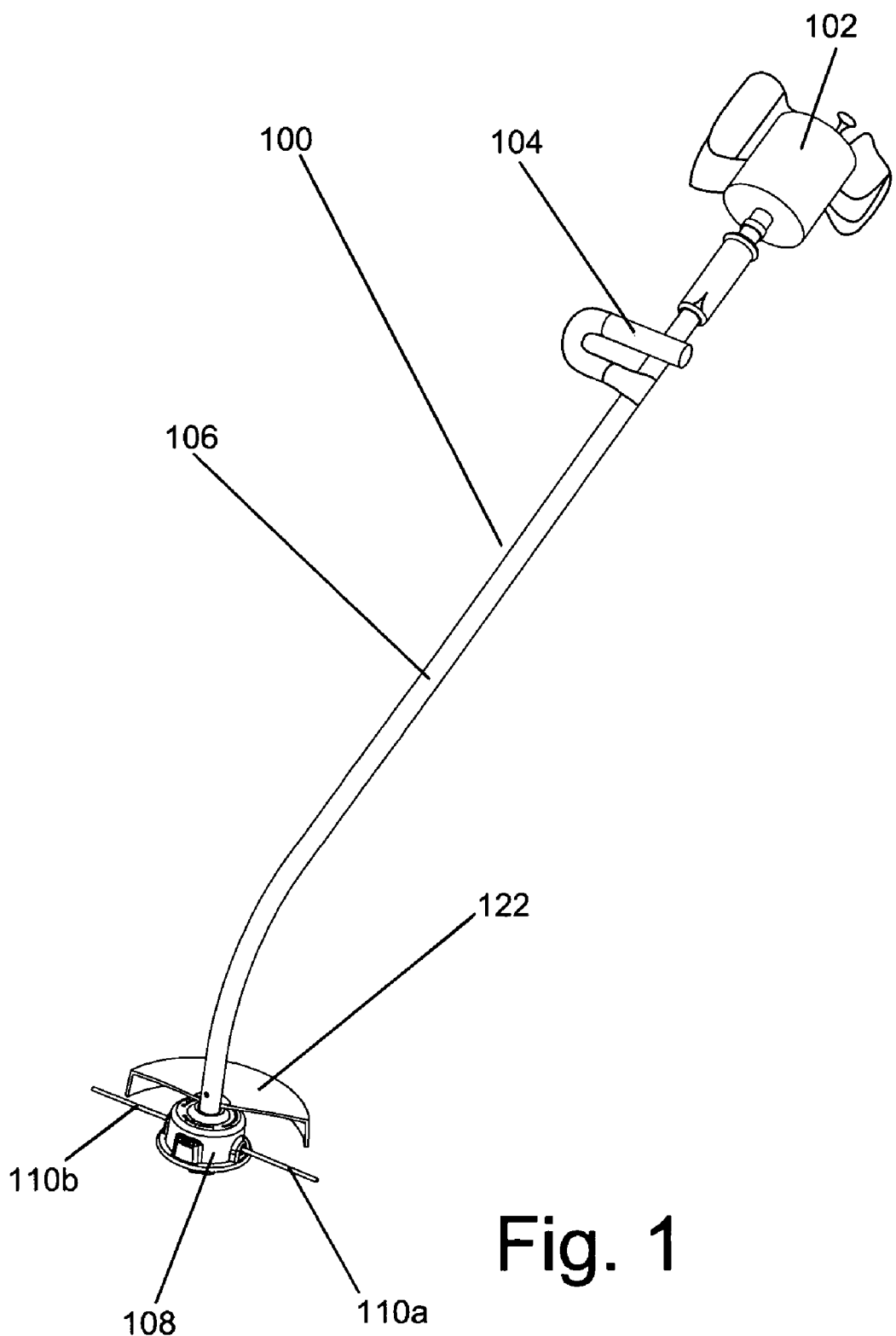
FIG. 1 is an illustration of an example of a vegetation trimmer according to the present invention.

FIG. 1 is an illustration of an example of a vegetation trimmer 100 according to the present invention. Vegetation trimmer 100 may include motor 102, steering handle 104, shaft 106, trimmer head 108, trimmer lines 110a and b, and optional shield 122. In other embodiments, vegetation trimmer 100 may not have all of the elements listed and/or may have other elements instead of or in addition to those listed.

Vegetation trimmer 100 may be a handheld device that is used for cutting vegetation or other material. Motor 102 powers vegetation trimmer 100. Motor 102 may be an electric motor, combustion engine, or another type of motor. Steering handle 104 may be used for holding, guiding, and directing the vegetation trimmer. Shaft 106 may also be used for holding vegetation trimmer 100. Shaft 106 may be hollow and, within the hollow portion, shaft 106 may contain a mechanical connection (which may be referred to as the driveshaft) coupling motor 102 to a trimmer head.

Trimmer head 108 may connect, via the driveshaft, to shaft 106 at a distal end. Trimmer head 108 may be used with other types of trimmers other than vegetation trimmer 100. For example, although vegetation trimmer 100 is illustrated as a handheld machine, an embodiment of trimmer head 108 may be used on a wheeled trimmer machine. As used herein, the terms "top" and "bottom" refer to the relative positions that the top and bottom of trimmer head 108 would assume when trimmer head 108 is "in use," when attached to shaft 106 of vegetation trimmer 100.

Trimmer head 108 may hold trimmer lines 110a and b, and may include a spinning portion that causes trimmer lines 110a and b to rotate at a fast enough speed to cut vegetation. Trimmer lines 110a and b may be a flexible wire. For example, trimmer lines 110a and b may be a nylon wire or other type of wire. As trimmer head 108 spins trimmer lines 110a and b tend to extend radially outward as a result of the centrifugal force. Although only two trimmer lines 110a and b are shown, there may be any number of trimmer lines. In an embodiment, the trimmer lines are symmetrically and/or equally spaced around the head. For example, if there are two trimmer lines, the two trimmer lines are placed 180 degrees apart, while if three trimmer lines are included, the trimmer lines may be placed 120 degrees apart. In an embodiment, trimmer lines 110a and b, may be any of a wide range of both different sizes (e.g., 0.047" to 0.160" in diameter) and of different shapes, such as round or non-round cross sections (e.g., square, octagon, hexagon, diamond, or oval). For example, each of trimmer lines 110a and b may be any trimmer line constructed as a flexible yet rugged filament, string, or wire. In an embodiment, trimmer lines 110a and b may be any of the commercially available flexible monofilament plastic trimmer lines of any suitable type and cross-sectional configuration, such as 0.065", 0.080", 0.095", 0.105", 0.12", 0.130" or 0.155" gauge nylon trimmer line or the like, which are currently used as cutting filaments in conventional vegetation trimmer apparatuses.

Optionally, vegetation trimmer 100 may include shield 122 for the operator's safety. Shield 122 may protect the user from flying debris that may be kicked up by rotating trimmer lines 110a and b or trimmer head 108.

In an embodiment, trimmer head 108 is a fixed line trimmer head for flexible line trimmers that does not require disassembly, and which can be easily and quickly loaded as well as easily and quickly unloaded without the use of a separate tool. In an embodiment, trimmer head 108 is a fixed line trimmer head for flexible line rotary trimmers that simplifies both easy loading and unloading of the trimmer line while providing a tight securement of the line to the head "non-dependent" of the rotational velocity of the head. In an embodiment, trimmer head 108 is for flexible line rotary trimmers, and includes a simplified easy trimmer line removal, and trimmer head 108 is of simple construction and economical to manufacture. In an embodiment, trimmer head 108 is for- flexible trimmer lines and simplifies easy trimmer line removal and replacement, which is adapted for use in heavy brush. In an embodiment, trimmer head 108 is for a flexible line rotary trimmer that has a simplified easy line removal and replacement while providing a tight securement of the line to the head independent of the rotational velocity of the head and is adaptable for use with cutting line of a wide variety of diameters and round and non-round shapes.

In an embodiment, trimmer head 108 is for a flexible line rotary trimmer that has a simplified line removal and replacement without the need for any disassembly and reassembly of trimmer housing parts while replacing the trimmer line. In an embodiment, trimmer head 108 is for flexible line rotary trimmers, which is more durable than known arrangements, and reduces (e.g., minimizes) wear on the string during operation. In an embodiment, trimmer head 108 is for flexible line rotary trimmers that can be used on the majority of gas and electric manufactured handheld, wheeled, vegetation, and brush cutting machines (e.g., multi-fit) and is for use by both home owners and commercial owners. In an embodiment, trimmer head 108 is for flexible line rotary trimmers, which simplifies both easy line loading and unloading of trimmer lines while providing a tight securement of the line to the head. The tightness of the securement may be dependent on the rotational velocity of the head. In an embodiment, trimmer head 108 includes a "one way" gripping device that may slide or pivot and may be spring biased.

In an embodiment, there are at least three forces that work together along with the serrated paws/teeth making contact with the nylon line which facilitate the functioning of these clamps under the extreme conditions that facilitate holding a single strand of trimmer line in a trimmer head housing until it either wears down abrasively or pre-maturely breaks off at the eyelet and/or grommet. In this specification, the word "paw" is used to refer to the profile of the jagged edge or rough surface of a cleat and the terms jagged edge and paw are interchangeable. Usually pre-mature breakage is caused by high heat levels generated by constant and extreme bending of the flexible line. Heat may be generated and transmitted through the nylon line by high friction levels when the cutting line is making constant contact with the vegetation or hard objects.

One force is the spring (this force may be insignificant). The purpose of the spring is to hold the line in the channel and to prevent the trimmer line from falling out prior to the other two forces taking effect and holding the trimmer line in place.

A second force is the outward pull generated by the centrifugal force upon the sliding or pivoting gripping members. In an embodiment, even at high rotational velocities, the centrifugal force would not be great enough to hold a single strand of cutting line in a trimmer head if not for a third force.

The third force is a combination of forces with a trimmer head cutting line that turns at 8,000 to 12,000 rpm while constantly contacting vegetation and hard objects, which creates a combination of high levels of pulling and frictional forces being applied to the extended length of trimmer line. In an embodiment, the third force is the dominant force that makes the mechanical one-way gripping devices perform effectively under this extreme application and environment.

In an embodiment, teeth may be placed on the clamping member. The word teeth may be replaced by paw to obtain another embodiment. The design of the teeth and the sharpness of the teeth is a factor in the relationship to the performance of the particular type of clamping member being used. In other words, sliding wedges, sliding discs, pivoting cams may each use different types of teeth.

Figure 2:
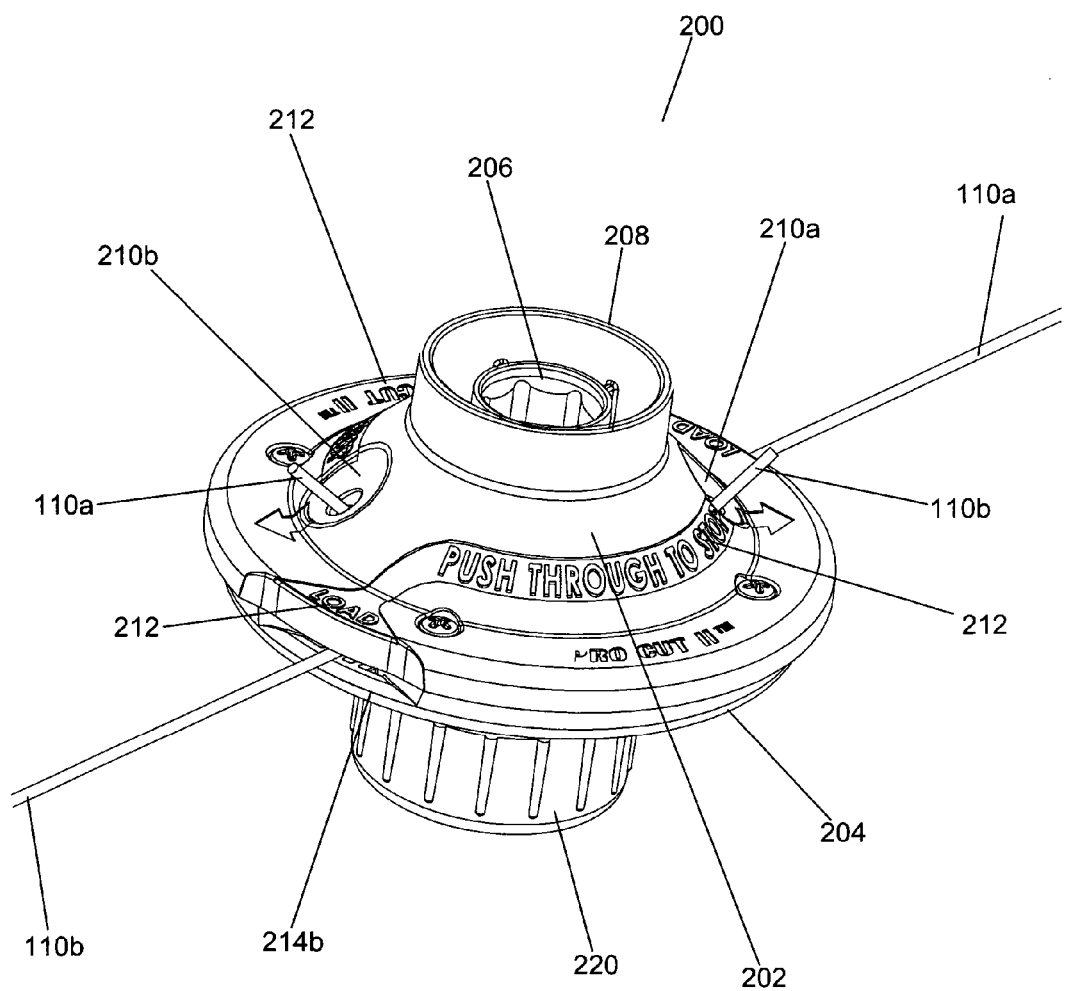
FIG. 2 shows an illustration of a side perspective view of an example of a trimmer head according to the present invention.

FIG. 2 shows a side perspective view of an example of trimmer head 200. Trimmer head 200 may include trimmer lines 110a and b, top 202, and bottom 204. Top 202 may include socket 206, neck 208, exit ports 210a and b, and labels 212. Bottom 204 may include entrance port 214b and knob 220. In other embodiments, trimmer head 200 may not have all of the elements listed and/or may have other elements instead of or in addition to those listed.

Trimmer head 200 is an embodiment of trimmer head 108. Trimmer lines 110a and b were discussed above in conjunction with FIG. 1. Socket 206 engages with shaft 106 holding trimmer head 200 to shaft 106, via the driveshaft, so that trimmer head 200 spins with shaft 106. Socket 206 is formed within neck 208.

Top 202 is the top portion of trimmer head 200, and bottom 204 is the bottom portion of trimmer head 200, which may each be made from a rigid plastic, via injection molding, for example. Exit ports 210a and b are the ports through which trimmer lines 110a and b exit. When trimmer lines 110a and b need to be removed, the user may pull trimmer lines 110a and b out through exit ports 210a and b. When trimmer lines 110a and b are inserted through the entrance ports, the user pushes trimmer lines 110a and b through until one end of trimmer lines 110a and b comes out of exit ports 210a and b. The user keeps pushing trimmer lines 110a and b into the entrance ports until a long enough portion sticks out of exit ports 210a and b that the user can easily grab trimmer lines 110a and b and pull trimmer lines 110a and b out of the trimmer head 200 when the user desires to remove trimmer lines 110a and b.

In contrast to exit ports 210a and b, prior trimmer heads have the exit ports on the bottom of the trimmer head. However, as the trimmer head spins a vacuum is created below the trimmer head sucking debris up into the exit ports, clogging the exits ports. The clogging of the exit ports makes it difficult to remove the trimmer line through the exit ports. Placing the exit ports on top of the trimmer head 200 decreases likelihood of debris entering or clogging the exit ports, because debris sucked up by the vacuum on the bottom of trimmer head 200 just hit bottom 204 and tend to bounce off without entering exit ports 210a and b on the top of trimmer head 200.

Labels 212 instruct the user how and where to load trimmer lines 110a and b (FIG. 1) into trimmer head 200. Labels 212 also instruct the user how to remove trimmer lines 110a and b from trimmer head 200. Labels 212 are discussed further in conjunction with FIG. 3A. Entrance ports 214a and b are the ports through which trimmer lines 110a and b are inserted into trimmer head 200. There is one exit port and one entrance port for each trimmer line.

Knob 220 is optional. Knob 220 holds and/or fastens top 202 to bottom 204. To take apart trimmer head 200, the user only needs to unscrew knob 220.

Figure 3A:
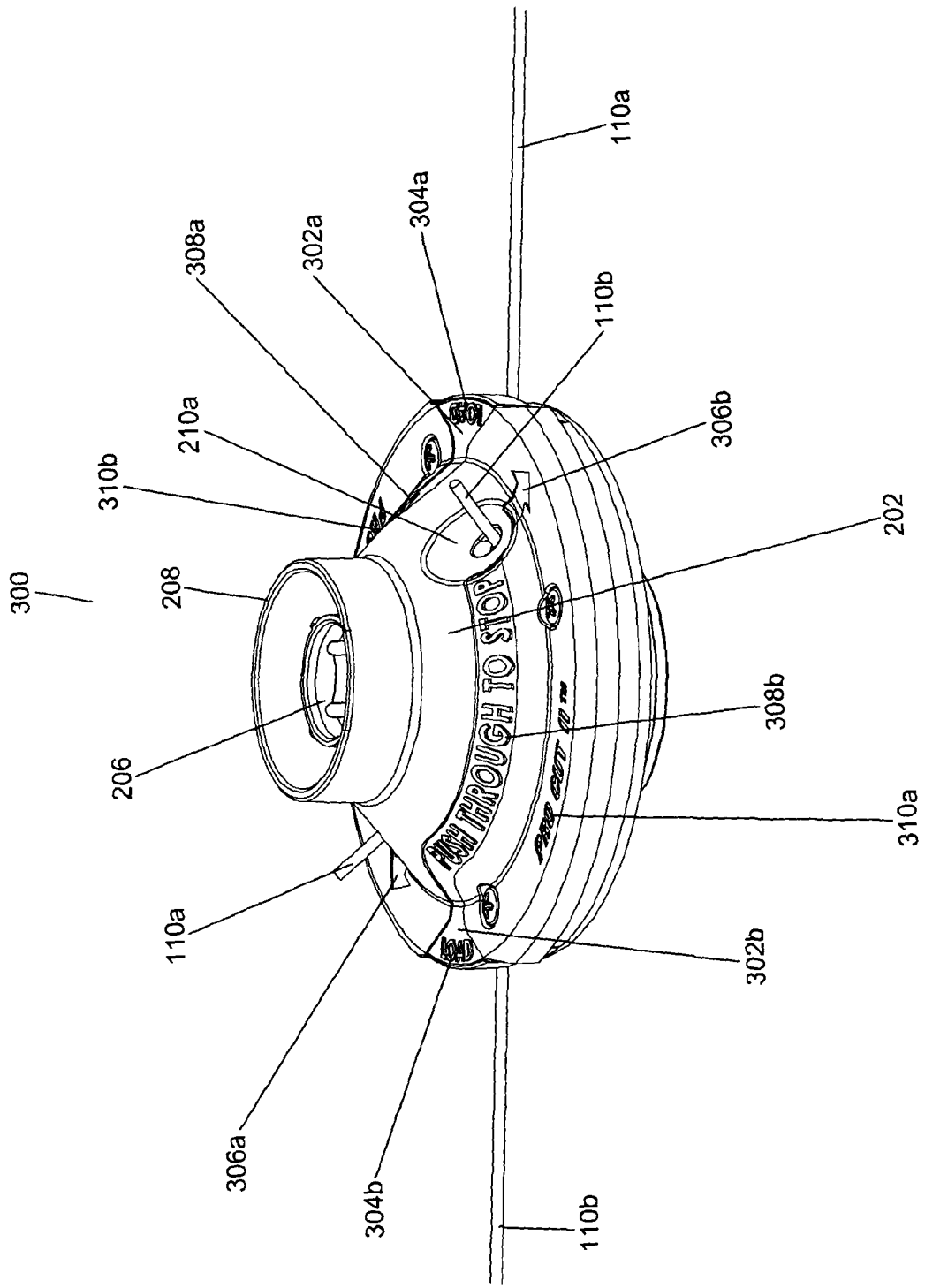
FIG. 3A shows an illustration of a side perspective view of an example of a trimmer head according to the present invention.

FIG. 3A shows an illustration of a side perspective view of an example of trimmer head 300. Trimmer head 300 may include trimmer lines 110a and 110b, socket 206, neck 208, and exit port 210a. Trimmer head 300 may also include load arrows 302a and b, load legends 304a and b, exit arrows 306a and b, exit legends 308a and b, and other legends 310a and b. In other embodiments, trimmer head 300 may not have all of the elements listed in conjunction with FIG. 3A and/or may have other elements instead of or in addition to those listed.

Trimmer lines 110a and b were discussed in conjunction with FIG. 1. Socket 206, neck 208, and exit port 210a were discussed in FIG. 2. Trimmer head 300 differs from trimmer head 200 in that trimmer head 300 does not have knob 220, but instead includes other fasteners to keep top 202 fastened to bottom 204.

Returning to the discussion of labels 212 (FIG. 2), load legends 304a and b, exit arrows 306a and b, exit legends 308a and b, and other legends 310a and b are examples of labels 212. Load arrows 302a and b in combination with load legends 304a and b indicate where to insert trimmer lines 110a and b (FIG. 1) and the direction in which to insert trimmer lines 110a and b. For example, load arrows 302a and b may be arrows above and/or below entrance ports 214a and b (FIG. 2) pointing in the direction in which trimmer lines 110a and b should be inserted. In an embodiment, load legends 304a and b may be the word "load" or the phrase "load in this direction" or another phrase indicating where and/or how to load trimmer lines 110a and b.

Exit arrows 306a and b in combination with exit legends 308a and b indicate how to remove trimmer lines 110a and b and the direction in which to pull trimmer lines 110a and b to remove trimmer lines 110a and b. For example, exit arrows 306 a and b may be arrows above exit ports 210a and b (FIG. 2) pointing up to indicate to pull trimmer lines 110a and b (FIG. 1) up to remove trimmer lines 110a and b. Exit legends 308a and b may include the words "Pull to remove" or another group of words that indicate that trimmer lines 110a and b need to be pulled out through exit ports 210a and b to remove trimmer lines 110a and b.

Figure 3B:
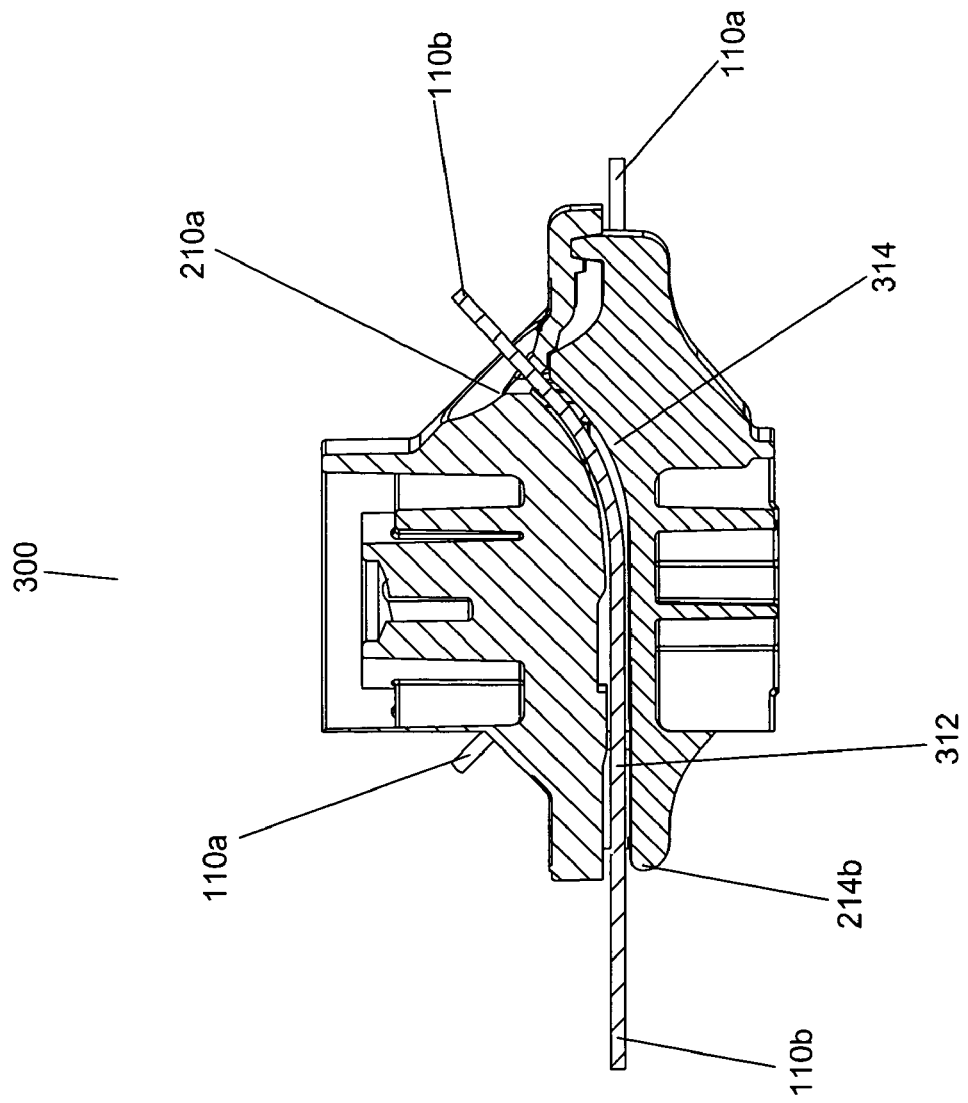
FIG. 3B shows an illustration of a cross section of an example of a trimmer head according to the present invention.

FIG. 3B shows a cross section of trimmer head 300. Trimmer head 300 includes trimmer lines 110a and b, exit port 210a, entrance port 214b, and channel 312 having bent portion 314. In other embodiments, trimmer head 300 may not have all of the elements listed in conjunction with FIG. 3B and/or may have other elements instead of or in addition to those listed.

Trimmer lines 110a and b were discussed in conjunction with FIG. 1, and exit port 210a and entrance port 214b were discussed in conjunction with FIG. 2. Channel 312 directs trimmer lines 110b from entrance port 214b to exit port 210a. Channel 312 may have bent portion 314, which is bent upwards so that trimmer lines 110b may be unloaded from the top of trimmer head 200. Additionally, in an embodiment, bent portion 314 is not only curved upwards, but is also curved to the side so that channel 312 does not intersect a location that is intended for receiving the driveshaft. In an embodiment, bent portion 314 may form an angle of 45 degrees with the horizontal plane formed by the extended trimmer line when the trimmer head is turned on. In an embodiment, bent portion 314 may form an angle of between 10 degrees and 80 degrees (e.g., 30 degrees or 60 degrees) with the horizontal plane formed by the extended trimmer line when the trimmer head is turned on. In an embodiment, bent portion 314 may form an acute angle with the direction of the straight portion of channel 312 at entrance port 214b (FIG. 2) or with the horizontal plane formed by the extended trimmer line when the trimmer head is turned on. Having bent portion 314 form an acute angle reduces the likelihood of trimmer lines 110b getting snagged within channel 312 and increases the ease with which the user can thread trimmer lines 110b through channel 312 to exit port 210a (FIG. 2). The smaller the angle the less likely a snag will occur, but if the angle is too small, channel 312 may interfere with the driveshaft or may exit trimmer head 200 (FIG. 2) at a point that is not on the top of trimmer head 200 unless the straight portion of channel 312 is oriented at an angle. Thus, in an embodiment, bent portion 314 is bent at a large enough angle so as to ensure that channel 312 does not interfere with the driveshaft and that the exit port is on the top of trimmer head 200.

Although FIG. 3B shows channel 312 as having bent portion 314, in another embodiment, channel 312 may be straight, but may be angled slightly upwards and to the side of the driveshaft so that the entrance port is on the periphery of trimmer head 200 or trimmer head 300, while the exit port is still on the top of trimmer head 200 (FIG. 2 or 3A) or 300 even though channel 312 is not bent. Alternatively, in addition to the straight part of channel 314 being mounted at an angle with respect to the plane formed by the ended trimmer line of the rotating trimmer head, channel 312 is also bent.

Figure 4A:
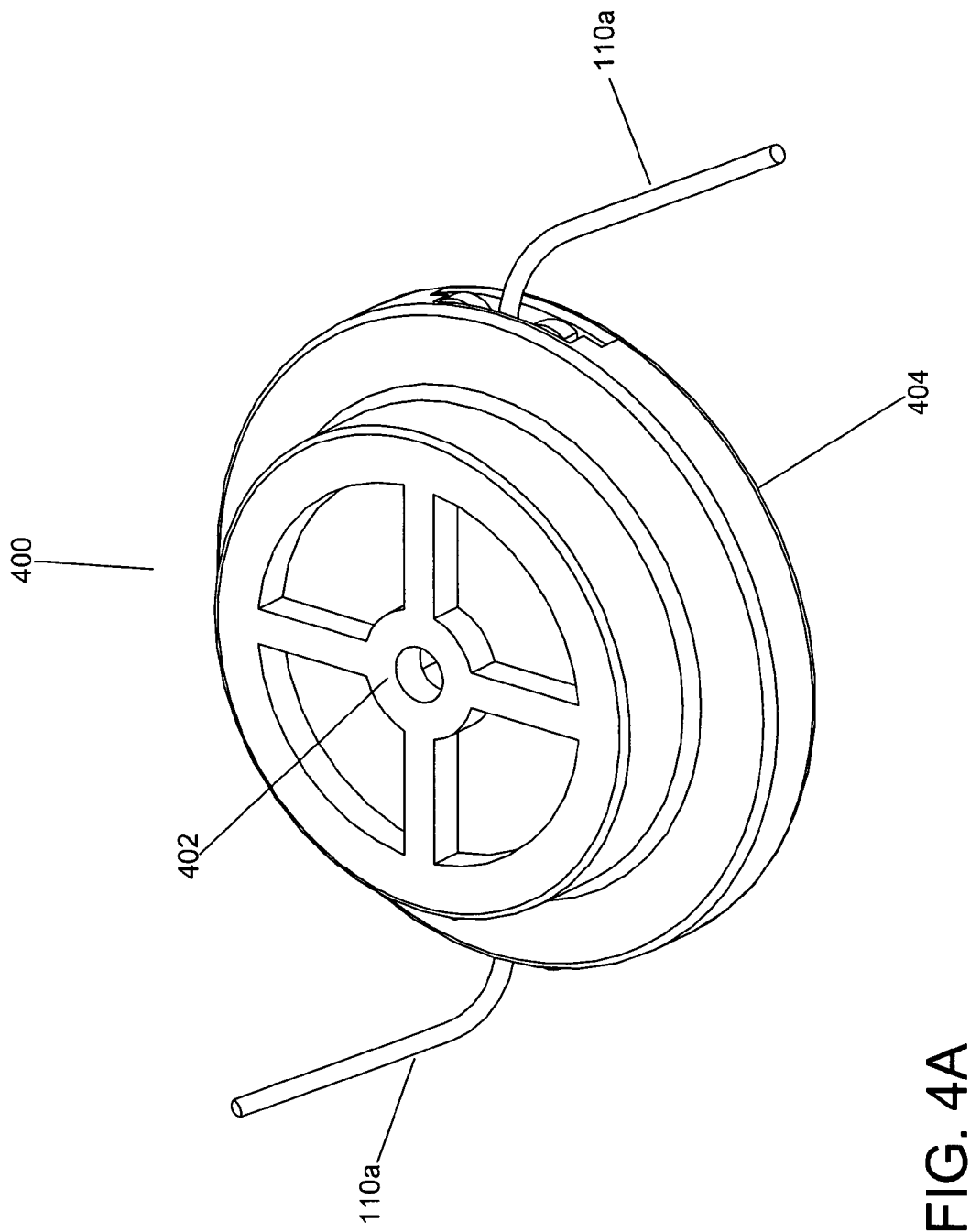
FIG. 4A shows an illustration of another example of a trimmer head according to the present invention.

FIG. 4A shows an illustration of another example of a trimmer head 400. Trimmer head 400 has top 402 and bottom 404. In other embodiments, trimmer head 400 may not have all of the elements listed and/or may have other elements instead of or in addition to those listed.

Trimmer lines 110a and b were discussed in conjunction with FIG. 1. Trimmer head 400 is another embodiment of trimmer head 108. Trimmer head 400 unloads from the bottom. Top 402 may be a first or "top" portion of trimmer head 400, and bottom 404 may be a second or "bottom" portion of trimmer head 400, both of which may be made from a rigid molded plastic (e.g., via injection molding). Upon the installation of the trimmer line a gripping mechanism (described hereinafter), top 402, and bottom 404 may be permanently or releasably fastened to one another. Optionally, to facilitate maintenance or repair of the trimmer head 400, top 402 and bottom 404 may be releasably connected by cooperating snaps, latches, or other fasteners. The entrance ports for trimmer lines 110a and b and the cleats that hold trimmer lines 110a and b prior to usage is discussed below.

Figure 4B:
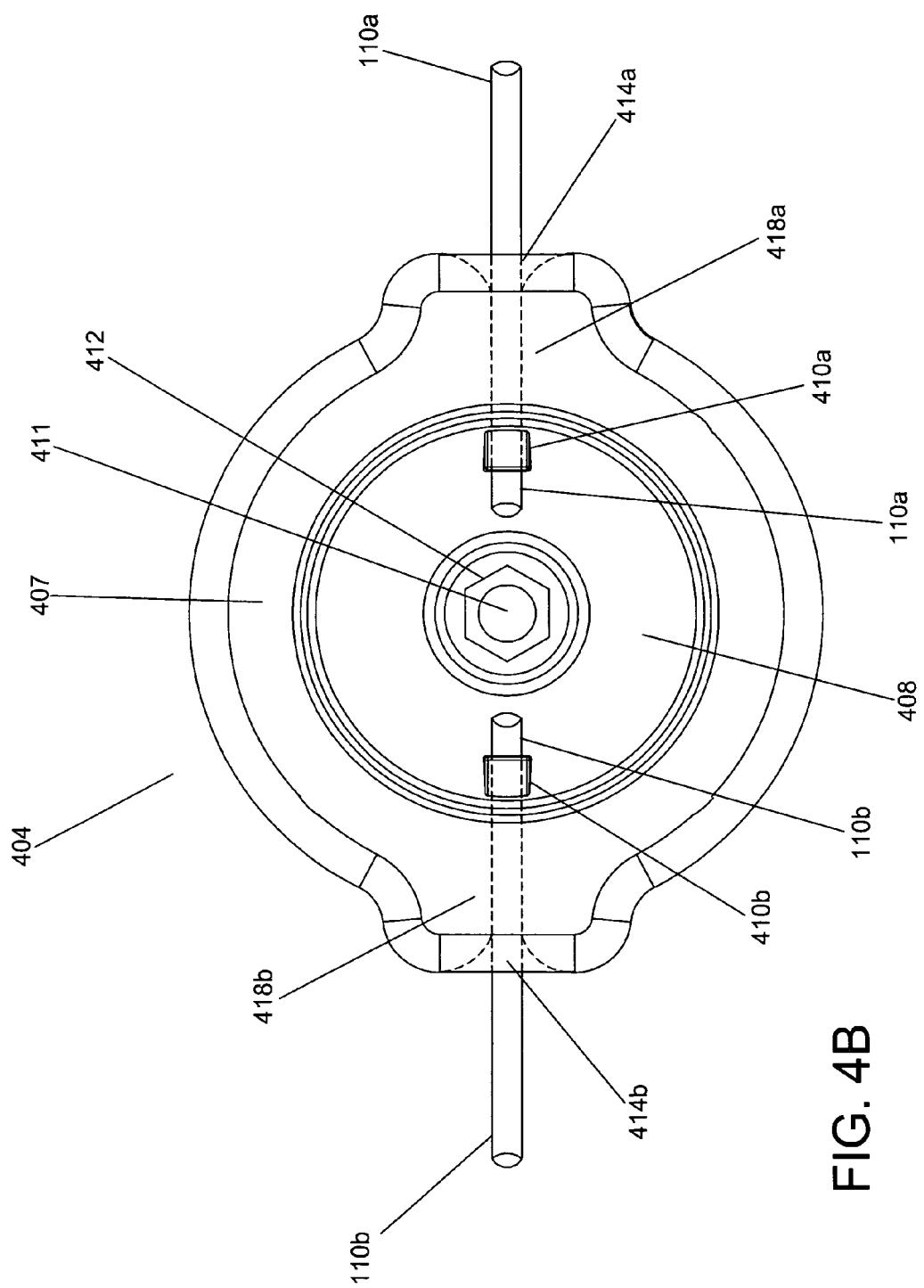
FIG. 4B shows an illustration of a bottom view of an embodiment of a bottom of a trimmer head according to the present invention.

FIG. 4B shows an illustration of a bottom view of bottom 404. Bottom 404 includes trimmer lines 110a and b, bottom side 407, exit ports 410a and b, underside of hub 408, impression 412, socket 411, and channels 418a and b. In other embodiments, bottom 404 may not have all of the elements listed and/or may have other elements instead of or in addition to those listed.

Trimmer lines 110a and b were discussed in conjunction with FIG. 1. Bottom side 407 is the bottom surface of bottom 404. Under-side of hub 408 is the underside of a raised portion of bottom 404. Exit ports 410a and b are the locations where trimmer lines 110a and b exit from bottom side of hub 408. In an embodiment, similar to the embodiment described in conjunction with FIGS. 2 and 3, upon inserting trimmer lines 110a and b, the user continues to push trimmer lines 110a and b through trimmer head 400 until a piece of the trimmer lines sticks out through exit ports 410a and b that is long enough to grab. To remove trimmer lines 110a and b the user pulls the trimmer line out by pulling by hand on the ends of trimmer lines 110a and b that are sticking out of exit ports 410a and b. Underside of hub 408 may appear as a depression when viewed from the bottom view of bottom 404. Within underside of hub 408 is hole 411, which opens into impression 412. Hole 411 receives the driveshaft associated with shaft 106 (FIG. 1). Impression 412 is shaped so as to engage a nut that threads on to a central bolt that attaches to the driveshaft of shaft 106 (FIG. 1), thereby holding trimmer head 400 to the driveshaft. Trimmer head 400 is a bottom unloading trimmer head, because trimmer head 400 unloads by pulling trimmer lines 110a and b out of trimmer head 400 from the underside of trimmer head 400, regardless of whether the exit ports are at the bottom most point of the trimmer head or somewhere else on the underside (or bottom) of the trimmer head.

In an embodiment, impression 412 may have a hexagonal shape for receiving and engaging a hexagonally shaped nut. Impression 412 prevents the nut from rotating with respect to bottom 404 and therefore prevents the nut from rotating with respect to trimmer head 400. In other embodiments, impression 412 may have other shapes that receive nuts of the corresponding shapes. For example, impression 412 may be square, octagonal, or another shape for receiving bolts that are square, octagonal, round or another shape, respectively. In an embodiment, the impression 412 is not round.

In order to attach trimmer head 400 to the rotating driveshaft of a trimmer apparatus, top 402 and bottom 404 are provided with aligned central bores, which have a diameter sufficient to receive the un-illustrated driveshaft. The underside of second bottom 404 is preferably molded so as to provide an integral central socket (and which is referred to as socket 411), for closely receiving an un-illustrated conventional hexagonal or other bolt nut that is adapted to mate with the threads of the driveshaft arbor and releasably attach trimmer head 400 to the driveshaft. The purpose of socket 411 is assure that trimmer head 400 is rotatably driven in unison with the driveshaft. Socket 411 (with the aid of impression 412) prevents slippage of trimmer head 400 with respect to the driveshaft in the event that the trimmer lines 110a and b of trimmer head 400 encounter solid objects or dense or otherwise difficult to cut grass, weeds or other vegetation. Additionally, by having the shape of impression 412 behave the same as the shape of the head of the bolt or nut that secures the trimmer head to the driveshaft, there is no need for a tool for turning the nut or bolt. In an alternative embodiment, impression 412 is incapable of grabbing the nut or bolt head that fits into impression 412. However, in an embodiment in which impression 412 is round and is also incapable of grabbing the nut or bolt head that fits in impression 412, the round shape may allow a tool to reach into impression 412 and engage the nut or bolt head so that the nut or bolt may be fastened with the tool.

Trimmer head 400 includes at least one passageway for releasably receiving at least one of trimmer lines 110a and b (FIG. 1) in the form of a finite length (approximately 4-12" in length) of flexible monofilament or wire, such as a plastic trimmer line, which may be a nylon strand or other material. For example, there may be two passageways, which may be channels 418a and b.

Channels 418a and b are shown using dashed lines to indicate that channels 418a and b are not visible when viewed from the bottom surface of bottom 404. Trimmer lines 110a and b enter trimmer head 400 via a gripping mechanism and continue through channels 418a and b until trimmer lines 110a and b exit bottom 404 via exit ports 410a and b, respectively. In an embodiment, channels 418a and b may be straight tube shaped passage ways (e.g., having a circular cross section). In other embodiments, channels 418a and b may not be straight and/or may have cross sections of other shapes (e.g., oval, square, rectangular, triangular, hexagonal, polygonal, or another shape).

Figure 4C:
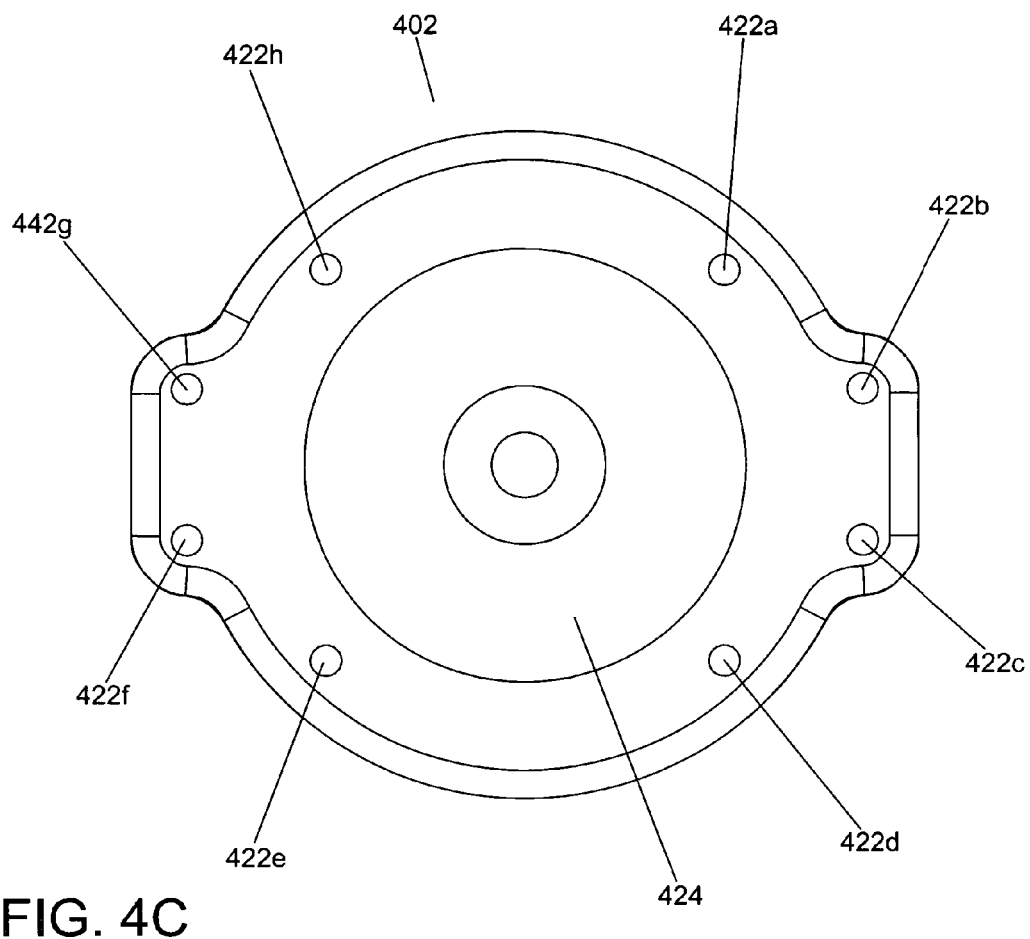
FIG. 4C shows an illustration of a bottom view of an example of a top of a trimmer head according to the present invention.

FIG. 4C shows an illustration of a bottom view of an example of top 402. Top 402 may include bores 422a-h and hole 424. In other embodiments, top 402 may not have all of the elements listed and/or may have other elements instead of or in addition to those listed.

Bores 422a-h may be depressions or holes within top 402 that interlock with a corresponding set of posts, such as post 426 which is discussed below. In an embodiment, screws may be inserted through bores 422a-h and screwed into a corresponding set of posts. Bottom 404 may be releasably connected by cooperating snaps, latches or, as illustrated, a plurality of aligned bores provided in each of the body members that receive a corresponding number of conventional bolts/screws and nuts.

Although a minimum of one of trimmer lines 110a and b (FIG. 1) and a passageway may be used in trimmer head 400, according to one embodiment, two oppositely directed trimmer lines 110a and b are deployed in trimmer head 108, each trimmer line having a "pair" of mirror-imaged clamping members with cleats that are spring biased. Furthermore, it will be understood that trimmer head 400 (and its counterparts in the other figures) may include three or more equiangularly spaced passageways for accommodating a corresponding number of cutting members. Hole 424 engages with a hub on bottom 404, which is mentioned below, such that the hub protrudes through hole 424 when trimmer head 400 is assembled.

Figure 4D:
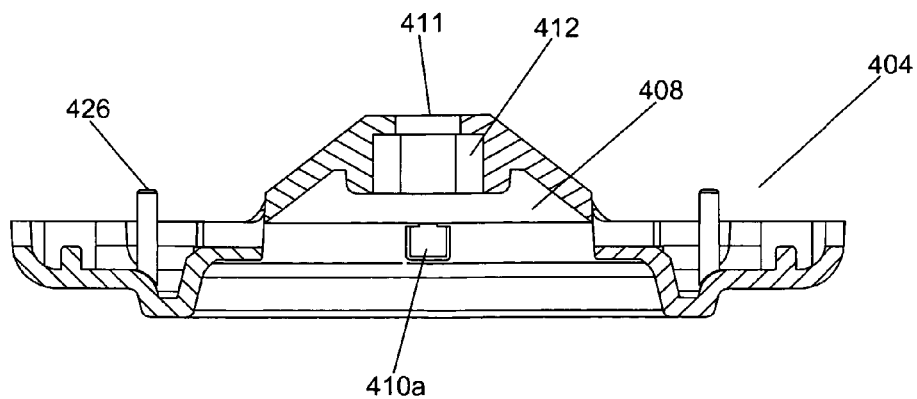
FIG. 4D shows an illustration of a cross section of an example of a bottom of a trimmer head according to the present invention.

FIG. 4D shows an illustration of a cross section of an example of bottom 404. FIG. 4D shows underside of hub 408, exit port 410a, hole 411, impression 412, and post 426. In other embodiments, bottom 404 may not have all of the elements listed in conjunction with FIG. 4D and/or may have other elements instead of or in addition to those listed.

Exit port 410a, underside of hub 408, impression 412 were discussed in conjunction with FIG. 4B, above. Underside of hub 408 is the underside of the hub that protrudes through hole 424 (FIG. 4B). Post 426 interlocks with a bore in top 402. Although only one post 426 is illustrated, there may be several posts and/or bores for interlocking with corresponding posts. Post 426 may be hollowed and threaded at the top to receive a screw.

Figure 5:
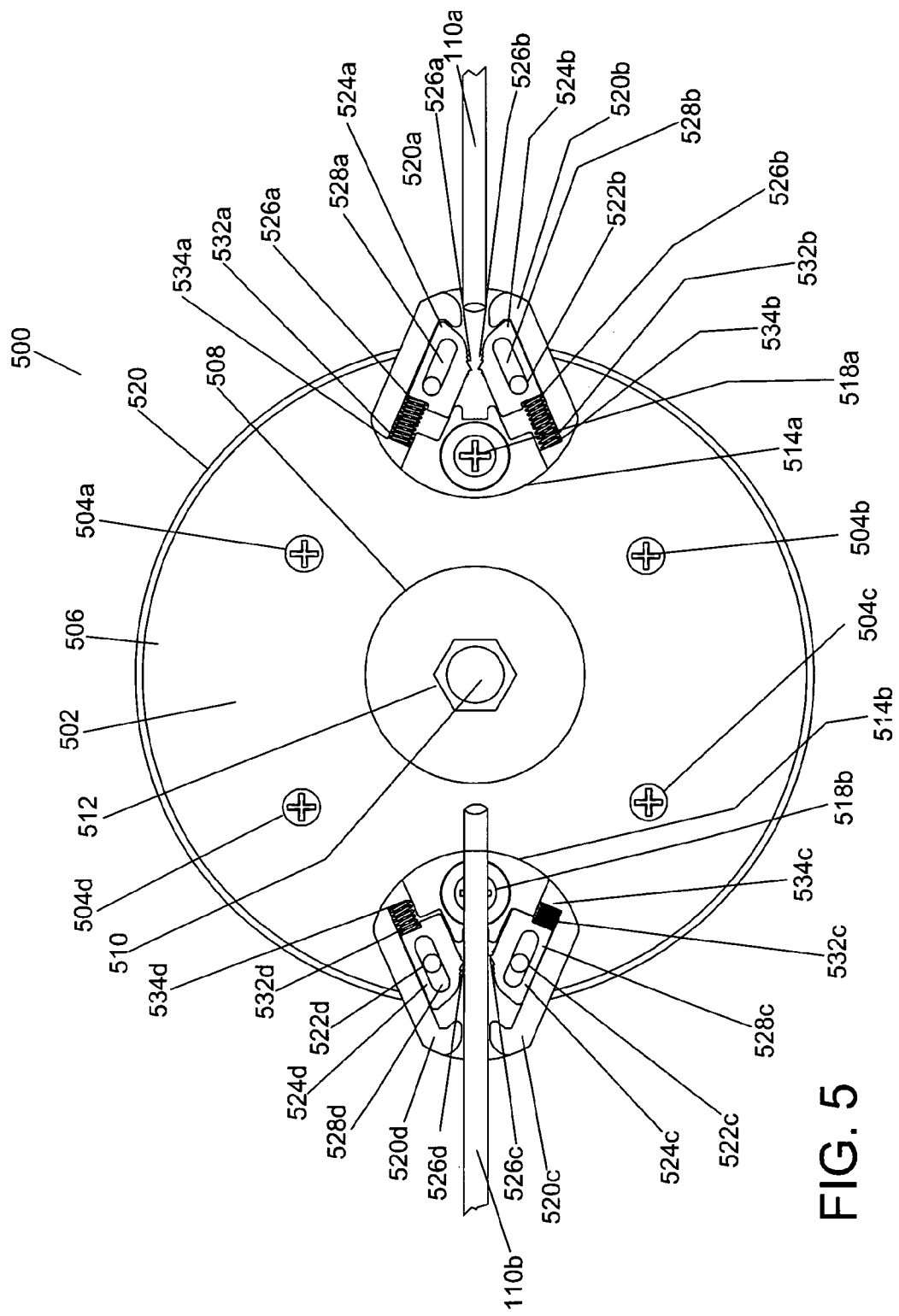
FIG. 5 shows an illustration of a top view of an example of a bottom of a trimmer head according to the present invention.
Figure 6:
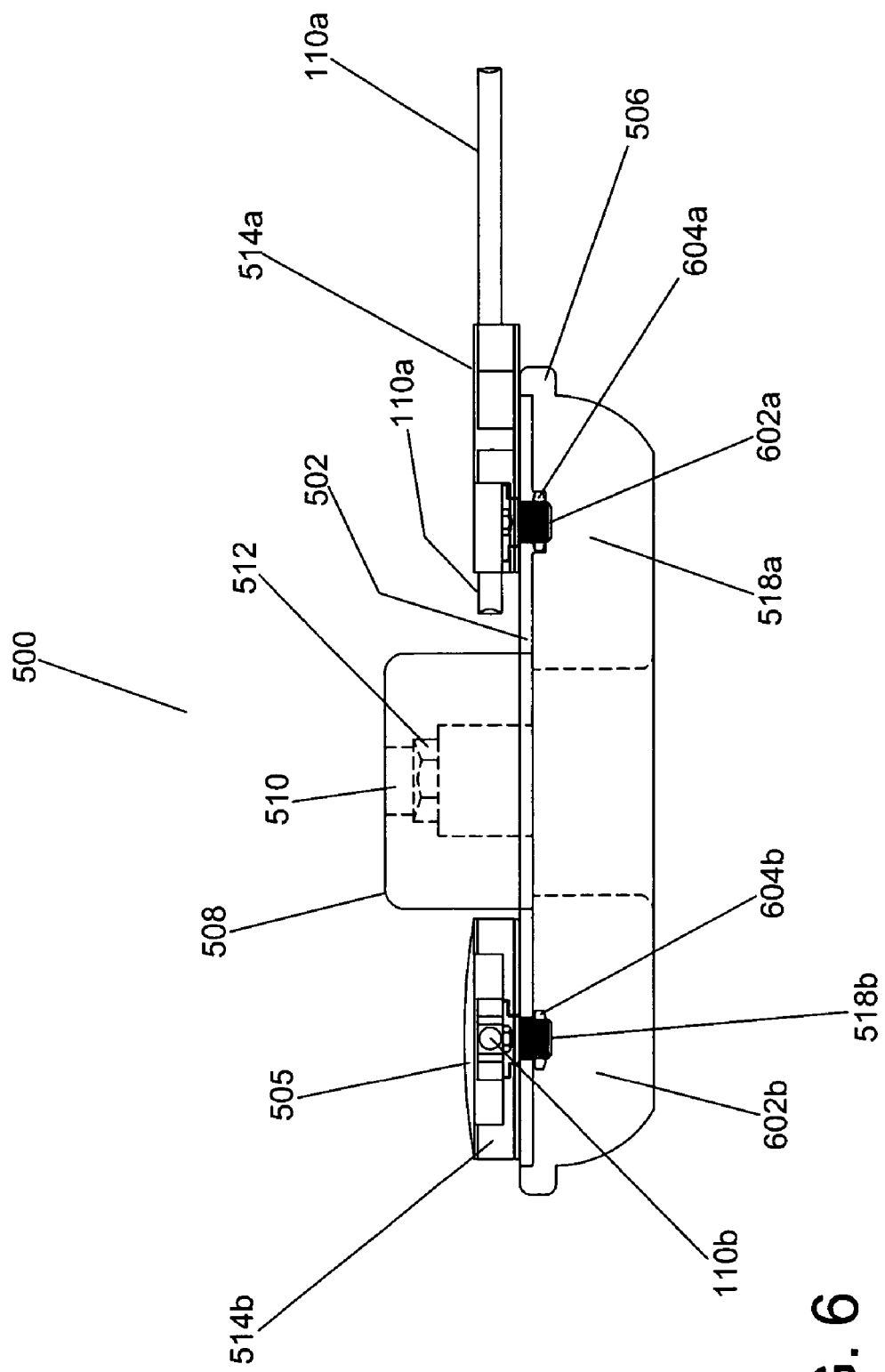
FIG. 6 shows an illustration of a side view of an example of a bottom of a trimmer head according to the present invention.

FIGS. 5-12 show different embodiments of cleats that form grabbing mechanisms for grabbing trimmer lines 110a and b. In some of the embodiments disclosed in FIGS. 5-12, in addition to disclosing a new embodiment of cleats, a new embodiment of a trimmer head is disclosed. In others of FIGS. 5-12 only the bottom portions of the trimmer head are disclosed. Specifically, FIGS. 5 and 6 show an embodiment of a trimmer head, and FIGS. 7-12 show embodiments of bottoms of trimmer heads. However, any of the cleats and grabbing mechanisms disclosed may be used in any of the trimmer heads disclosed. Also, any of the bottom portions of FIGS. 7-12 may be used with any of the embodiments of FIGS. 1-4D. In particular, any of the different embodiments of cleats of FIGS. 5-12 may be used with any of the different embodiments of FIGS. 1-4D. For example, any of the different types of cleats of FIGS. 5-12 may be included in either a top loading trimmer head or a bottom loading trimmer head.

FIG. 5 shows an illustration of a top view of an example of trimmer head 500 of trimmer head 108. Trimmer head 500 may include cover 502, screws 504a-d, rim 506, hub 508, hole 510, impression 512, modules 514a and b, and trimmer lines 110a and b. Modules 514a b have pivots 518a and b, walls 520a-d, pins 522a-d, cleats 524a-d, jagged surfaces 526a-d, slots 528a-d, and springs 532a-d. In other embodiments, trimmer head 500 may not have all of the elements listed and/or may have other elements instead of or in addition to those listed.

Trimmer lines 110a and b were discussed in conjunction with FIG. 1. Trimmer head 500 is another embodiment of a top unloading trimmer head. Cover 502 supports the modules having cleats. Cover 502 is supported by the housing of trimmer head 500. Screws 504a-d attach cover 502 to the housing of trimmer head 500. Hub 508 protrudes through a hole in the center of cover 502. Hub 508 attaches to shaft 106, so that trimmer head 500 spins with shaft 106. Hub 508 is similar to hub 408, which was discussed above in conjunction with FIG. 4B-4D, and therefore has a similar description. For example, hole 510 is at the top of hub 508. Hole 510 opens into impression 512. Impression 512 is similar to impression 412, and therefore has a similar description. For example, a portion of the driveshaft of shaft 106 (FIG. 1) is placed through hole 510 into impression 512. A screw within impression 512 holds shaft 106 to hub 510 and prevents hub 510 from slipping off shaft 106 and facilitates attaching trimmer head 500 to the driveshaft by hand without a tool.

Modules 514a b include cleats for holding trimmer lines 110a and b in place. Trimmer lines 110a and b may be an embodiment of trimmer lines 110a and b. Pivots 518a and b rotateably connect modules 514a b to cover 502 so that modules 514a b are capable of pivoting. One factor that contributes to the breakage of trimmer lines 110a and b is the bending and unbending of trimmer lines 110a and b. Specifically, upon hitting an object, the trimmer lines 110a and b that hits the object tends to bend inwards towards trimmer head 108. After the trimmer line is free from the object that was struck, trimmer lines 110a and b tends to unbend outwards as a result of the centrifugal force caused by the spinning of trimmer head 108. The repeated bending and unbending of trimmer lines 110a and b fatigues trimmer lines 110a and b, which weakens trimmer lines 110a and b, which in turn may contribute to the causes for the breaking of trimmer lines 110a and b. Allowing modules 514a b to pivot, reduces the amount of bending of trimmer lines 110a and b by reducing the angle of the bend. The pivoting motion of the modules 514a b absorbs some of the impact received by trimmer lines 110a and b. Consequently, trimmer lines 110a and b tend to last longer as a result of allowing modules 514a b to pivot.

Walls 520a-d assist in giving structural integrity to modules 514a and b. Walls 520a-d may reduce the likelihood of debris entering modules 514a and b (which could prevent the inner mechanism from moving freely and functioning properly). Walls 520a-d may protect the inner mechanism of modules 514a and b from damage in other ways. Walls 520a-d may partially guide the sliding of the cleats of module 514a and b to assist the cleats in sliding in the proper direction and/or manner. Walls 520a-d may form part of eyelets or other openings within which trimmer lines 110a and b (FIG. 1) are inserted. Walls 520a-d may guide trimmer lines 110a and *b* into trimmer head 108 (FIG. 1) and between the cleats that hold the trimmer line in place.

Pins 522*a-d* (in conjunction with walls 520*a-d*) guide the cleats of modules 514*a* and *b*, such that the cleats slide in a desired direction. Pins 522*a-d* are located within slots 528*a-d* of the cleats of modules 514*a* and *b*.

Cleats 524*a-d* slide within modules 514*a b* and hold trimmer lines 110*a* and *b* in place. Cleats 524*a-d* are mechanically biased to remain in a closed position, so that no matter the orientation of the trimmer head 108 trimmer lines 110*a* and *b* are held in place by cleats 524*a-d*. However, the mechanical bias may be relatively weak, so that trimmer lines 110*a* and *b* may be easily slid through modules 514*a* and *b* and out the back of modules 514*a* and *b*. Alternatively, if modules 514*a b* are included in trimmer head 200, trimmer lines 110*a* and *b* slide into trimmer head 108 via entrance ports 214*a* and *b* and out of exit ports 210*a* and *b*, respectively. Cleats 524*a-d* are oriented such that as cleats 524*a-d* slide outwards from the center of trimmer head 108, cleats 524*a-d* are also pushed inwards, tending to clamp trimmer lines 110*a* and *b*. Thus, as trimmer head 108 spins, the centrifugal force tends to cause cleats 524*a-d* to clamp trimmer lines 110*a* and *b*, and hold trimmer lines 110*a* and *b* in place. Cleats 524*a-d* are guided by a combination of walls 520*a-d*, pins 522*a-d* and slots within cleats 524*a-d*. As cleats 524*a-d* slide, sides of cleats 524*a-d* slide parallel to the sides of walls 520*a-d*, while slots 528*a-d* are located on pins 522*a-d*, which holds cleats 524*a-d* within a particular location and at a particular orientation. Each of modules 514*a b* has two of cleats 524*a-d*. In other words, there are two cleats for each module and two cleats for each trimmer line.

In the embodiment of FIG. 5, by placing trimmer line between two moving cleats, the force required for sliding trimmer lines 110*a* and *b* through trimmer head 108 is reduced when compared to the force required to move trimmer lines through trimmer head 108 (FIG. 1), were only one cleat present for each trimmer line. The surface area in contact with trimmer lines 110*a* and *b* while trimmer lines 110*a* and *b* are clamped by cleats 524*a-d* is smaller than were one of the cleats in each of modules 514*a* and *b* replaced with a stationary wall, and consequently there is less friction holding trimmer lines 110*a* and *b* in place when pulling trimmer lines 110*a* and *b* out through the exit ports (e.g., in the back of modules 514*a* and *b*), so that trimmer lines 110*a* and *b* are easier to remove. Additionally, since both sides of the clamping mechanism can move away from trimmer lines 110*a* and *b*, there is less force holding trimmer lines 110*a* and *b* in place (while removing the trimmer lines via the exit ports) than were only one side of the clamping mechanism movable.

In an embodiment, cleats 524*a-d* are metallic and the portion of cleats 524*a-d* that pinches trimmer lines 110*a* and *b* is exposed to the air via the back and/or front of modules 514*a* and *b*. Alternatively, walls 520*a* and *b* and/or other portions of modules 514*a b* may also be metallic so as to draw the heat from cleats (which absorb the head heat from trimmer lines 110*a* and *b*). Consequently, since cleats 524*a-d* conduct heat and are either exposed to air or other metallic components that are exposed to air, cleats 524*a-d* draw the heat from trimmer lines 110*a* and *b*. The heat absorbed by cleats 524*a-d* dissipates (either directly or indirectly) into the air as the trimmer head 108 spins. Consequently, cleats 524*a-d* cool trimmer lines 110*a* and *b*. In contrast, without any cooling mechanism the friction of trimmer lines 110*a* and *b* hitting and rubbing against objects as the objects that are being cut heat and thereby soften trimmer lines 110*a* and *b*. The heating of trimmer lines 110*a* and *b* may cause trimmer lines 110*a* and *b* to break earlier than were trimmer lines 110*a* and *b* not heated. Consequently, using metal for cleats 524*a-d*, and allowing a portion of cleats 524*a-d* to be exposed to air during operation tends to extend the life of trimmer lines 110*a* and *b*. In and embodiment, cleats 524*a-d* can securely retain a wide range of both different sizes of trimmer line (e.g., 0.047" to 0.160" diameter.) and of different shapes of trimmer line, such as round and non-round cross section fixed lengths of cutting line (i.e. square, octagon, hexagon, diamond, or oval).

Each of jagged surfaces 526*a-d* is located on one of cleats 524*a-d*, respectively. Jagged surface 526*a-d* is a surface that is made jagged, so as to dig into trimmer lines 110*a* and *b*, which assists in holding trimmer lines 110*a-d* in place. In an embodiment, each of jagged surfaces 526*a-d* includes teeth that are angled so that the pointy portion of the teeth face inwards partially in the direction that trimmer lines 110*a* and *b* are pulled when trimmer lines 110*a* and *b* are pulled out of trimmer head 108. As a result of the angling of the teeth of jagged edges 526*a-d*, when one of trimmer lines 110*a* and *b* is pulled in a direction that is opposite the direction in which trimmer lines 110*a* and *b* are intended to be loaded (into trimmer head 108), the teeth of jagged surface 526*a-d* dig into trimmer lines 110*a* and *b*. However, in contrast, as a result of the angling of the teeth of jagged surfaces 526*a-d* the teeth do not dig into trimmer lines 110*a* and *b* while trimmer lines 110*a* and *b* are being pushed or pulled (or for other reasons travels) in the loading direction (which is the same as the unloading direction). The loading direction or unloading direction is the direction that trimmer lines 110*a* and *b* are intended to travel while being loaded into, or unloaded out of, trimmer head 108. In an embodiment, each of jagged edges 526*a-d* have one large tooth that juts beyond the peaks of the remainder of the jagged edges associated with the corresponding one of jagged edges 526*a-d*. The large tooth may snag trimmer lines 110*a* and *b* when trimmer lines 110*a* and *b* are pulled out through entrance ports in the backs of modules 514*a* and *b* in the opposite direction for the intended direction of loading trimmer lines 110*a* and *b*. It is cheaper from a manufacturing standpoint to ensure that only one tooth is, or a finite number of teeth are, sharp enough to snag trimmer lines 110*a* and *b* than to ensure that each peak of jagged surfaces 526*a* and *b* are sharp enough so that the combination of all the peaks of each of jagged surfaces 526*a* and *b* are sharp enough to snag trimmer lines 110*a* and *b* when pulled in a direction that is opposite from the intended loading direction.

In other words, the faces of cleats 524*a-d* include jagged edges 526*a-d*, respectively, which are adapted to contact trimmer lines 110*a* and *b*. Jagged edges 526*a-d* are preferably provided with at least one sharp protrusion such as one or more ribs or corrugations, knurling or other textured surfacing for enhancing the gripping of the trimmer lines 110*a* and *b* by cleats 524*a-d*, which optionally may include one large protrusion.

Slots 528*a-d* are the slots located within cleats 524*a-d* on which cleats 524*a-d* slide and which guide cleats 528*a-d*, respectively. Springs 532*a-d* are compression/expansion springs that create the mechanical bias pushing cleats 526*a-d* closed. In an embodiment, even when no trimmer line is present, springs 532*a-d* are slightly compressed. In an alternative embodiment, when no trimmer line is present springs 532*a-d* are able to decompress to a relaxed configuration. In other words, cleats 524*a-d* are provided with elongated slots (slots 528*a-c*) for receiving guide pins (pins 522*a-d*). This cooperating pin and slot arrangement between the fixed line trimmer head 108 and cleats 524*a-d* assures that each of cleats 524*a-d* is restrained to smooth, linear reciprocating motion at the aforementioned acute angle and prevents the disengagement of cleats 524a-d from springs 532a-d in the event that the trimmer lines 110a and b should experience violent impacts arising from contact with objects that are harder than the vegetation being trimmed and/or especially dense vegetation.

According to one embodiment, each of the modules 514a and b are for releasably gripping trimmer lines 110a and b, and each of modules 514a and b includes a compression spring (springs 532a-c), which are adapted to be received within the aft portions of chambers 534a-d of modules 514a and b. Springs 532a-d slide within the chambers 534a-d as springs 532a-d are compressed and stretched. The generally "D-shaped" rigid cleats (cleats 524a-d) are configured to be received within the fore portion of the chambers 534a-d. One end of each of springs 532a-d is attached to, and/or seated against, a rear wall of aft portion of the chambers 534a-d of modules 514a and b, whereas the opposite ends of each of compression springs 532a-d are attached to, and/or seated against, cleats 524a-d. In an embodiment, walls 520a-d are molded to include a lip portion that functions as a stop for cleats 524a-d when trimmer lines 110a and b are not present in the passageway trimmer line. Springs 532a-d may be selected to have lengths such that it is at least slightly compressed when seated in the aft portion of the chambers 534a-d, between the rear wall of the aft portion of the chambers 534a-d and cleats 524a-d, even when trimmer lines 110a and b are not present in passageway for the trimmer line.

In order to position one of trimmer lines 110a and b in trimmer head 500, trimmer lines 110a and b are inserted into openings that form entrance ports in modules 514a and b of trimmer head 500. Alternatively, if modules 514a and b are placed within and of trimmer heads 200 or 400, trimmer lines 110a and b are inserted into openings that form entrance ports 214a and b or entrance ports 414 a and b, which are in the periphery of trimmer head 200 or 400, respectively. Trimmer lines 110a and b are passed along a passageway formed in trimmer head 108 until the trimmer lines 110a and b come into contact with jagged edges 526a-d of cleats 524a-d. Trimmer lines 110a and b are then further inserted by the user such that the free end of the trimmer lines 110a and b projects a desired distance from the periphery of trimmer head 108. As trimmer lines 110a and b passes the cleats 524a-d, trimmer lines 110a and b displace cleats 524a-d within chambers 534a-d along the acute angle at which chambers 534a-d are oriented with respect to the passageway for the trimmer line. The user then releases trimmer lines 110a and b, and cleats 524a-d settle into gripping contact with trimmer lines 110a and b under the influence of springs 532a-d. If the protrusion is present, on jagged edges 526a-d, it may be desirable for the protrusions to at an appropriate acute angles and as sharp as needed to penetrate the surface of trimmer lines 110a and b in a direction that is opposite to the direction of insertion of trimmer lines 110a and b to enhance the biting and holding effect of the cleats 524a-d on the trimmer lines 110a and b (FIG. 1), while allowing trimmer lines 110a and b to slide while being inserted or removed. The biting effect is further enhanced by centrifugal force when trimmer head 108 is rotatably driven by the driveshaft coupled to motor 102 (FIG. 1). Trimmer head 108 may rotate at a rotational speed of between 8-12,000 rpm while making constant contact with vegetation and/or other objects. The contact with the vegetation and other objects creates frictional forces pulling on trimmer lines 110a and b, which is the dominant force that makes the mechanical one way gripping devices formed by modules 514 a and b perform effectively under these extreme applications and environments.

In order to replace damaged or worn trimmer lines 110a and b (FIG. 1), the user stops the trimmer apparatus and grasps the inner end of trimmer lines 110a and b by hand (without the use of a tool or a built-in manually operated actuator device) and the user withdraws the trimmer lines 110a and b through exit ports in the back of module 514a and b of trimmer head 500. Alternatively, if modules 514a and b are used in trimmer head 200 or 400, the user withdraws the trimmer lines 110a and b by hand through or through exit ports 210a and b (FIG. 2) of trimmer head 200 or 410a and b (FIGS. 4B and 4C) of trimmer head 400. One may incorrectly think that since the gripping provided by two actuators is better than the gripping provided by one actuator, therefore it may be necessary to include an actuator to open the cleats. Similarly, one may incorrectly think that the trimmer line may get stuck to and frozen on the cleats just as when there is a stationary wall in place of one of the cleats. However, when using the dual cleats, the trimmer line does not get stuck to the cleats and the trimmer line may be inserted easily into the trimmer without any levers or actuators, at least if the mechanical bias (the springs) are not too stiff. New trimmer lines 110a and b may then be inserted in its place as described above.

Each of the chambers 534a-d opens to, and is disposed with respect to, its respective combination the entrance ports in the front of modules 514a and b, the passage way for the trimmer line between cleats 524a-d within modules 514a and b, the exit ports in the back of modules 514a and b. If modules 514a and b are placed within trimmer head 200 or 400, each of the chambers 534a-d opens to, and is disposed with respect to, its respective combination of one of entrance ports 214a and b or 414a and b, passageways for the trimmer lines, and exit ports 210a and b or 410a and b for trimmer lines 110a and b to pass through. In an embodiment, a pair of gripping cleats (pair of cleats 524a and b and pair of cleats 524c and d) form mirror-images of one another, and are mounted at identically the same distance apart from each other for the clamping of each single fixed cut length strand of line to be held by trimmer head 108. Consequently, the clamping mechanism in these embodiments, is simple, reliable and comparatively inexpensive to construct and may be readily adapted to virtually any rotatable trimmer head design. Eliminating a manually operated actuator device(s) associated with each pair of clamping members used for loading and unloading the fixed lengths of trimmer line forming a line holding system.

Not only are gripping mechanisms such as modules 514a and b more user friendly than prior art manners of gripping trimmer line, but there is a substantial improvement because modules 514a and b simplify the operation of the dual clamping member system and saves a significant amount in manufacturing costs when compared to more complicated prior art devices. By reducing the number of moving parts by almost 50% over at least some prior art devices (without loss of functionality), the potential of mechanical malfunctioning is also reduced.

FIG. 6 shows an illustration of a side view of an example of trimmer head 500 of trimmer head. Trimmer head 500 may include cover 502, cover 505, rim 506, hub 508, hole 510, impression 512, modules 514a and b, and trimmer lines 110a and b. Modules 514a and b have pivots 518a and b, which include screws 602a and b and nuts 604a and b. In other embodiments, trimmer head 500 may not have all of the elements listed in conjunction with FIG. 6 and/or may have other elements instead of or in addition to those listed.

Cover 502, rim 506, hub 508, hole 510, impression 512, modules 514a and b, and trimmer lines 110a and b were described above in conjunction with FIG. 5. Cover 502 is the top of, and covers, module 514b. Cover 502 protects module 514b from debris entering and jamming the grabbing mechanism. Although not shown, a similar cover is placed on top of, and protects, module 514a. Each of pivots 518a and b may be coupled to (e.g., held to) cover 502 by one of screws 602a and b which has a head that is above a floor of one of modules 514a and b. Screws 602a and b extend through cover 502 and engage in nuts 602a and b. In another embodiment, other fasteners (e.g., rivets) hold modules 514a b to cover 502.

Figure 7:
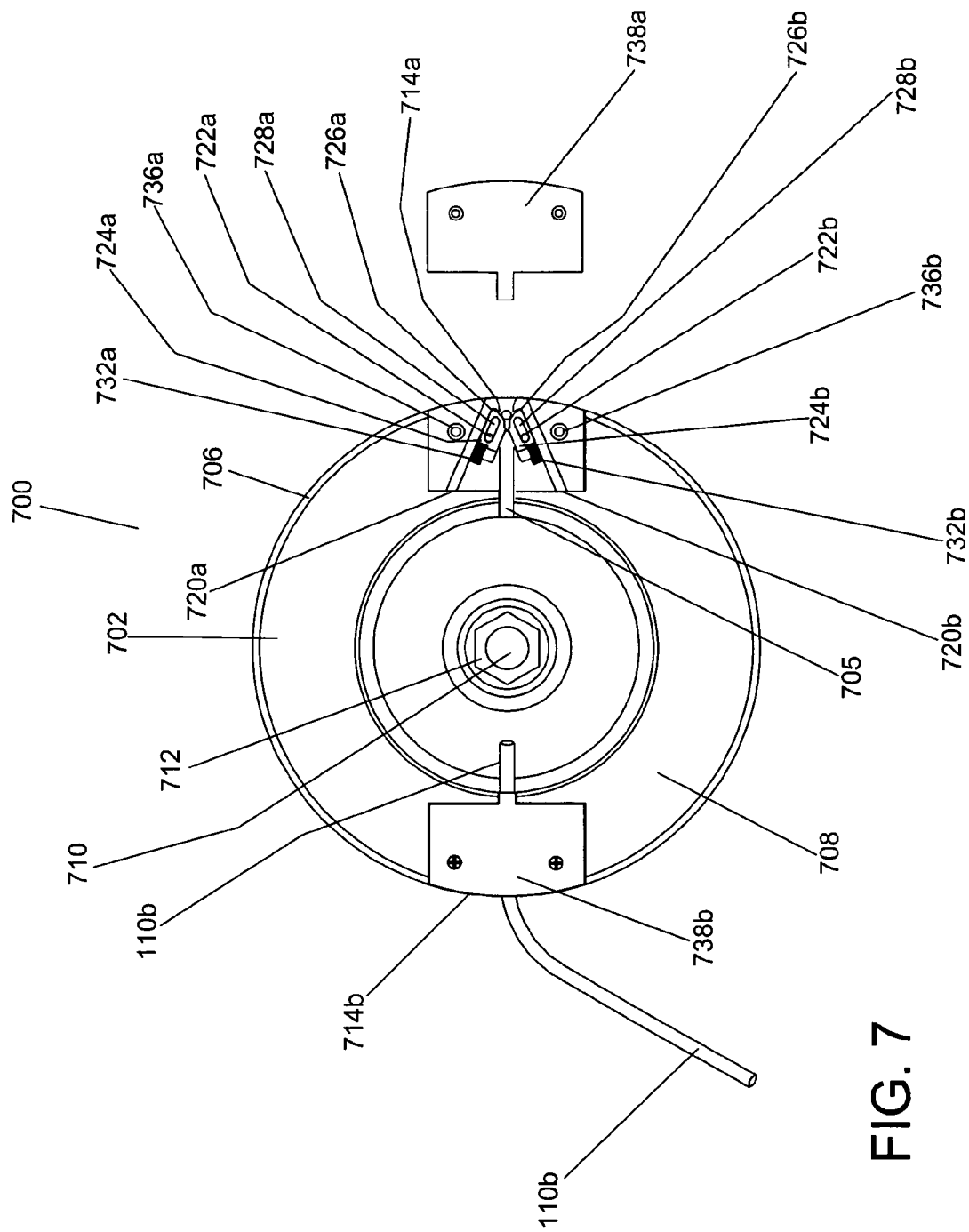
FIG. 7 shows an illustration of a top view of an example of a bottom of a trimmer head according to the present invention.

FIG. 7 shows an illustration of a top view of an example of bottom 700 of trimmer head 108. Bottom 700 may include trimmer line 110b, cover 702, rim 706, hub 708, hole 710, units 714a and b. Units 714a and b have walls 720a and b, pins 722a and b, cleats 724a and b, jagged surface 726a and b, slots 728a and b, springs 732a and b, fasteners 736a and b, and covers 738a and b. In other embodiments, bottom 700 may not have all of the elements listed and/or may have other elements instead of or in addition to those listed.

Trimmer head Bottom 700 is an embodiment of a bottom unloading trimmer head 404. Trimmer lines 110a and b were discussed in conjunction with FIG. 1. Cover 702, rim 706, hole 710, walls 720a and b, pins 722a and b, cleats 724a and b, jagged surface 726a and b, slots 728a and b, and springs 732a and b may be similar to cover 502, rim 506, hole 510, walls 520a-d, pins 522a-d, cleats 524a-d, jagged surface 526a-d, slots 528a-d, and springs 532a-d and have essentially the same description, which were described above in conjunction with FIG. 5. However, units 714a and b differ from modules 514a and b in that units 714a and b are molded into cover 702. Consequently units 714a and b are stationary and do not rotate. Additionally, in the embodiment of FIG. 7 no part of cleats 724a-d is exposed to air. Fasteners 736a-d fasten units 714a and b to cover 702 in a stationary manner. Fasteners 736a-d may be screws or another fastener. Covers 738a and b are the top covers of units 714a and b. Covers 738a and b protect the inner mechanism of units 714a and b from damage and/or from debris. Since bottom 700 has fewer moving parts and fewer parts than trimmer head 500, bottom 700 may be cheaper to manufacture and more durable. However, trimmer head 500 may be simpler to repair than module 700, because if modules 514a and b break, trimmer head may be repaired by simply replacing the entire module.

Figure 8:
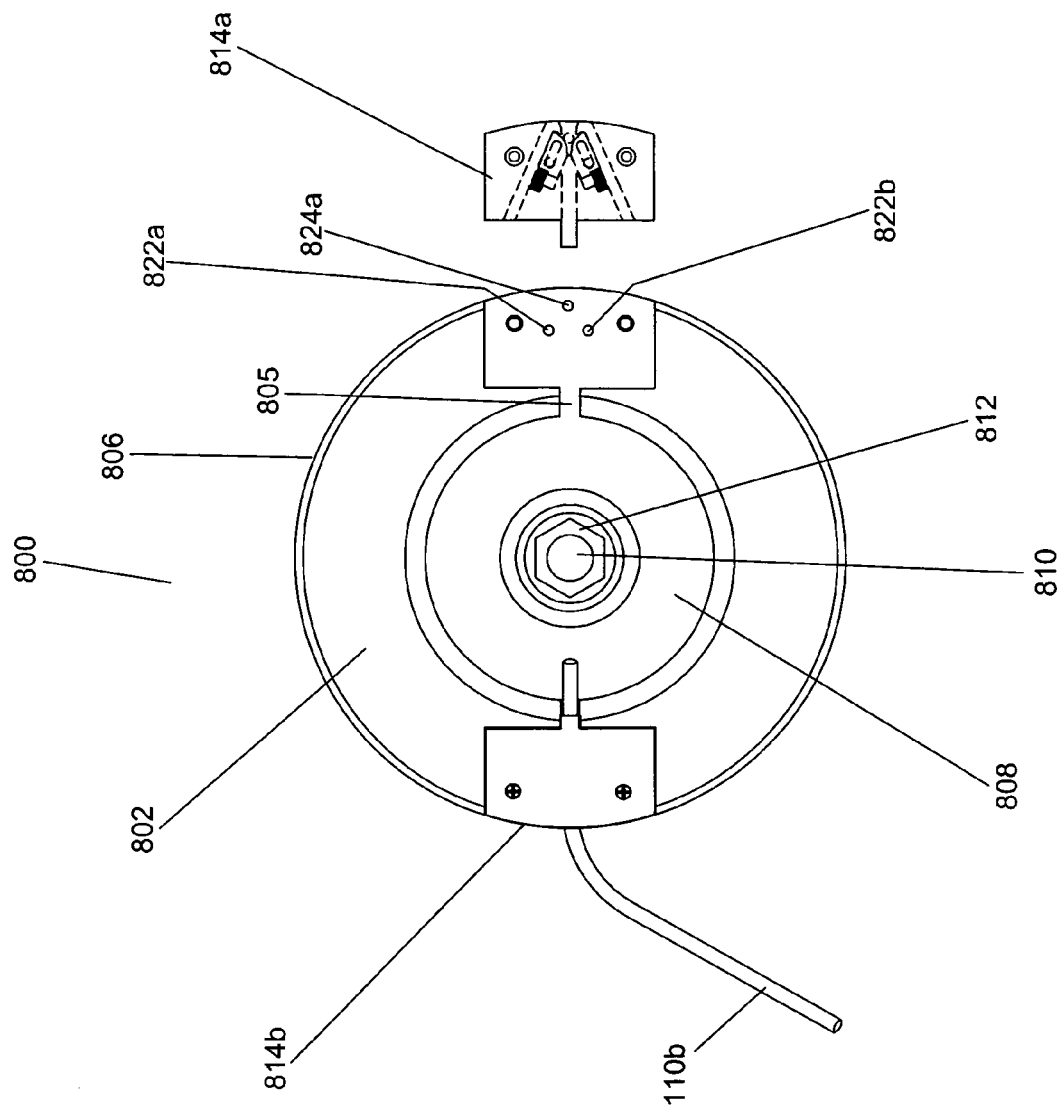
FIG. 8 shows an illustration of a top view of an example of a bottom of a trimmer head without modules according to the present invention.

FIG. 8 shows an illustration of a top view of an example of bottom 800 of trimmer head 108 without module 814a removed. Bottom 800 may include cover 802, rim 806, hub 808, hole 810, impression 812, pins 822a and b, and pin 824a. In other embodiments, bottom 800 may not have all of the elements listed and/or may have other elements instead of or in addition to those listed.

Bottom 800 is an embodiment of a bottom unloading trimmer head 404. Cover 802, rim 806, hub 808, hole 810, impression 812, and pin 822a are similar to and have essentially the same description as cover 502, rim 506, hub 508, hole 510, impression 512, and pins 522a-d, which were described in conjunction with FIG. 5 or as cover 702, rim 706, hub 708, hole 710, and pins 722a and d, which were described in conjunction with FIG. 7. However, in contrast to units 714a and b modules 814a and b are removable. Also, in contrast to modules 514a and b, modules 814a and b are stationary and do not rotate. In contrast to pins 722a-d, pins 822a-d aid in aligning modules 814a and b with cover 802. Similarly, pins 824a and b also aid in aligning modules 814a and b with cover 802. Since modules 814a and b are easier to replace, it may be easier to repair bottom 800 than bottom 700.

Figure 9:
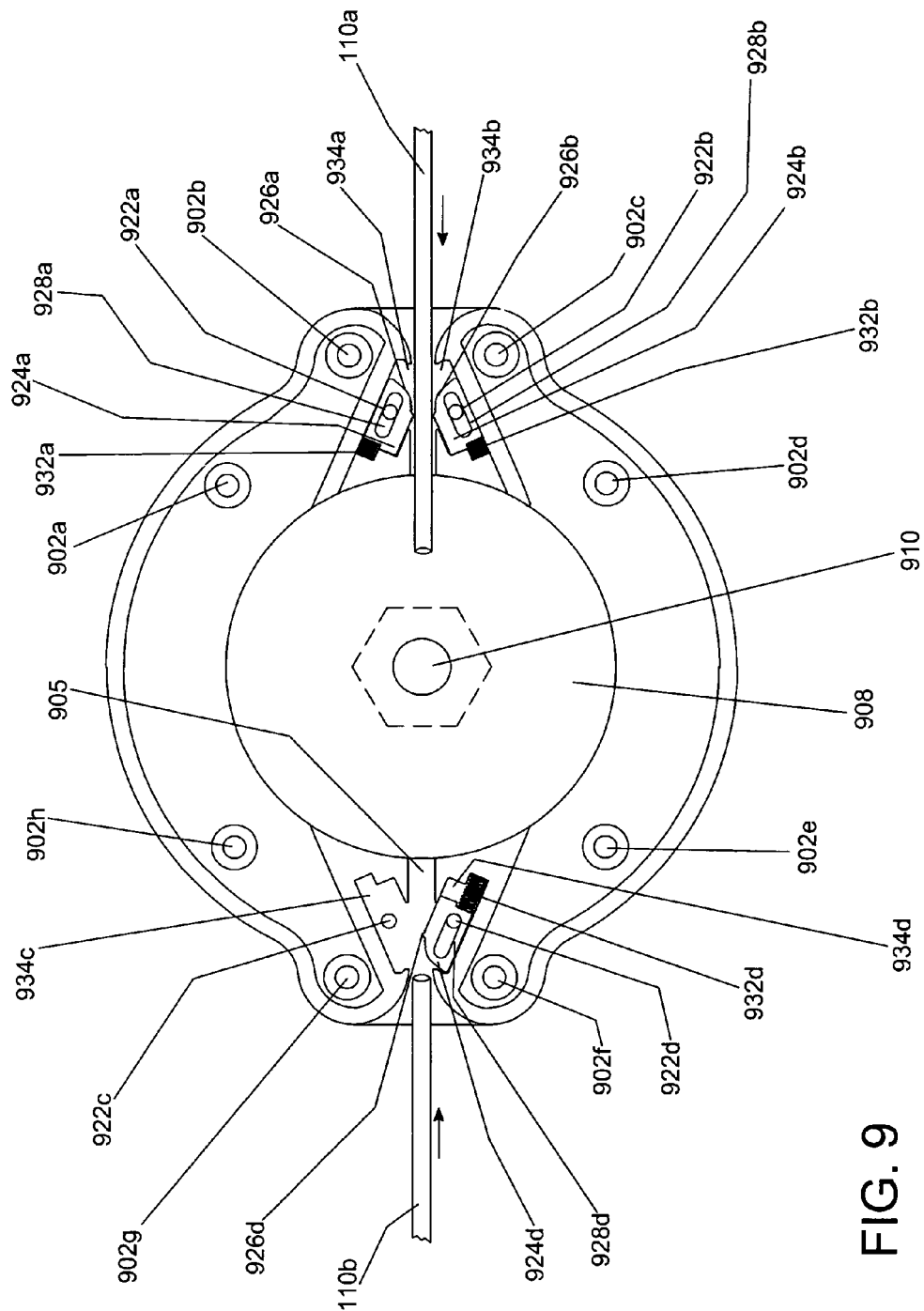
FIG. 9 shows an illustration of a top view of an example of a bottom of a trimmer head according to the present invention.

FIG. 9 bottom 900 may include trimmer lines 110a and b, posts 902a-h, passageway 905, pins 922a-d, cleats 924a, 924b, and 924d, jagged surface 926a, 926b, and 926d, slots 928a, 928b, and 928d, springs 932a, 932b, and 932d, and chambers 934a-d. In other embodiments, bottom 900 may not have all of the elements listed and/or may have other elements instead of or in addition to those listed.

Posts 902a-h may be the same as post 426 (FIG. 4), which may interlock with bores 422a-h. Passageways 905a and b are the passageways in which trimmer lines 110a and b are directed when inserted into trimmer head 900. The other embodiments may each have passageways similar to passageways 905a and b. However, the corresponding passageways were not labeled, because the other FIGs. were crowded with other labels.

Pins 922a-d, cleats 924a, 924b, and 924d, jagged surfaces 926a, 926b, and 926d, slots 928a, 928b, and 928d, springs 932a, 932b, and 932d are similar to passageway pins 522a-d, jagged surface 526a-d, slots 528a-d, and springs 532a-d (which were discussed in conjunction with FIG. 5), and therefore have essentially the same explanation. However, although cleats 524a-d are located in modules 514a and b (FIG. 5), cleats 924a, b, and d are mounted directly onto bottom 900.

Chambers 934a-d are formed in bottom 900 for the sake of housing a mechanism for gripping trimmer lines 110a and b. In other words, for each of trimmer lines 110a and b, bottom 900 is molded so as to form a chamber (one chambers 934a-d) within which a mechanism for releasably gripping trimmer lines 110a and b is constructed. Each of chambers 934a-d opens to, and disposed at an acute angle with respect to, its respective one of passageways 905a and b. Each of chambers 934a-d preferably has a narrow aft portion and an enlarged fore portion. Depending on space considerations associated with 924a, b, and d, a particular trimmer head design, the angle of chambers 934a-d may range from about 10 degrees to about 80 degrees with respect to the passageways 905a and b.

Figure 10A:
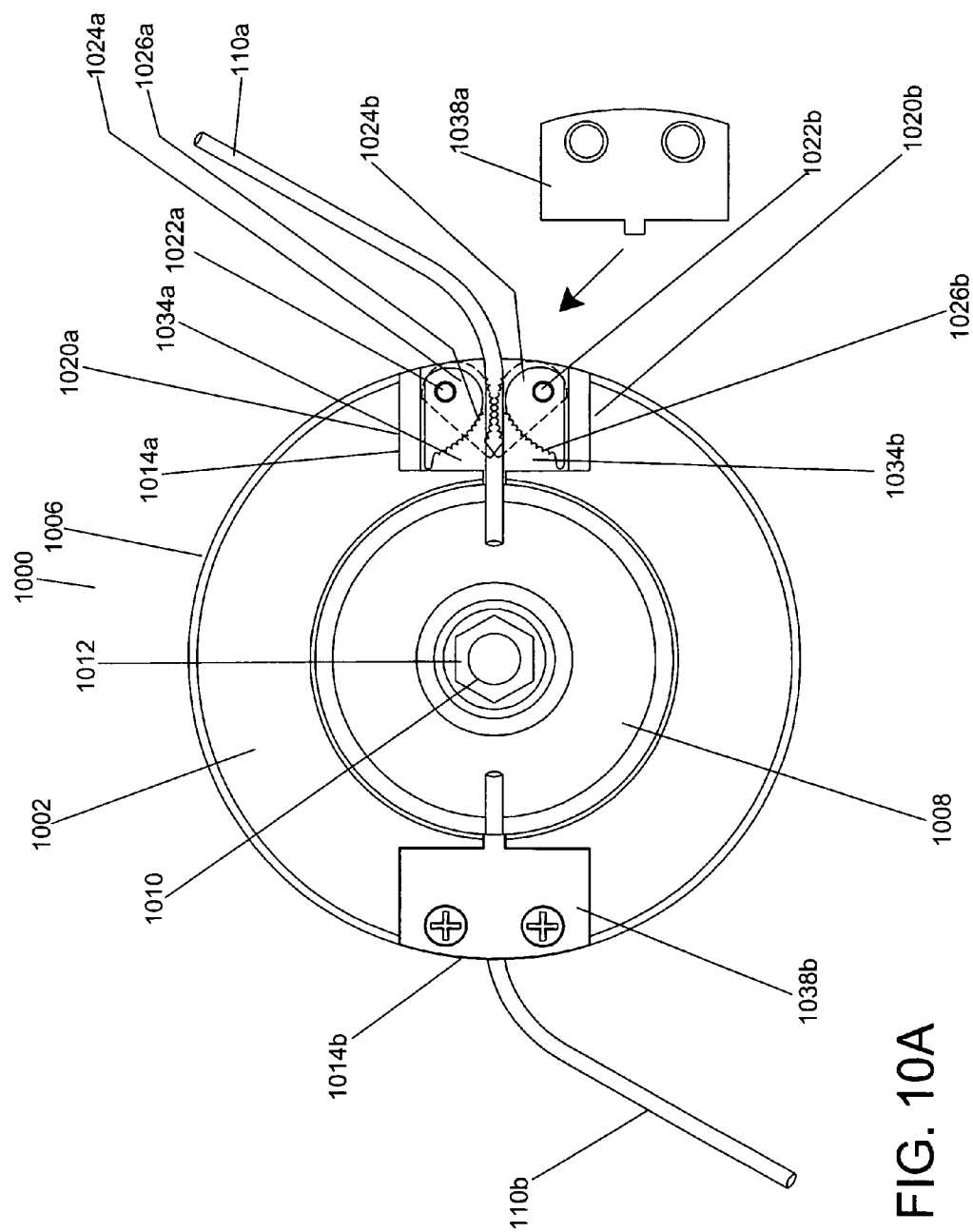
FIG. 10A shows an illustration of a top view of an example of a bottom of a trimmer head according to the present invention.

FIG. 10A is an illustration of a top view of an example of bottom 1000 of trimmer head 108. Bottom 1000 may include cover 1002, rim 1006, hub 1008, hole 1010, impression 1012, units 1014a and b, and trimmer lines 110a and b. Units 1014a and b have ledges 1020a and d, pins 1022a and d, cleats 1024a and d, jagged surface 1026a and b, chambers 1034a and b, and covers 1038a and b. In other embodiments, bottom 1000 may not have all of the elements listed and/or may have other elements instead of or in addition to those listed.

Cover 1002, rim 1006, hub 1008, hole 1010, impression 1012, units 1014a and b, and trimmer lines 110a and b are similar to and have essentially the same description as cover 502, rim 506, hub 508, hole 510, impression 512, modules 514a and b (FIG. 5). Ledges 1020a and b, cleats 1024a and b, jagged surface 1026a and b, and cover 1038a and b are similar to walls 520a-d, pins 522a-d, cleats 524a-d, jagged surface 526a-d, cover 532a-, and chambers 534a-d.

In contrast to FIG. 5, units 1014a and be are formed within a depression in bottom 1000, and ledges 1020 support cover 736a, such that cover 736a may be flush with surface 1002. Ledges 1020a and b may nonetheless function similarly to walls in that torsion springs may press against the sides of ledges 1020a and b. Cleats 1024a-d rotate, whereas cleats 524a-d slide. In an embodiment, cleats 1024a-d are also metallic, and the surface facing outward with respect to bottom 1000 is exposed to the air, which cools the trimmer line. Cleats 1024a-d may be viewed by the user by looking into the entrance ports, such as the entrance port at the front of units 1014a and b. Alternatively, if units 1014a and b are included within trimmer head 200 or 400, cleats 1024a-d may be viewed by the user by looking into entrance ports 214a and b or 414a and b. Also, although cleats 524a-d slide on pins 522*a-d*, cleats 1024*a-d* pivot on pins 1022*a-d*. Consequently, cleats 1024*a-d* aid in cooling trimmer lines 110*a* and 110*b*. Moving away from pins 1022*a-d* towards the center bottom 1000, the radius of cleats 1024*a-d* gets larger causing cleats 1024*a-d* to clamp into trimmer lines 110*a* and *b* as trimmer lines 110*a* and *b* are pulled out of trimmer head 108 through the entrance ports instead of through the exit ports (e.g., as a result of the frictional forces caused by the trimmer line cutting vegetation).

Figure 10B:
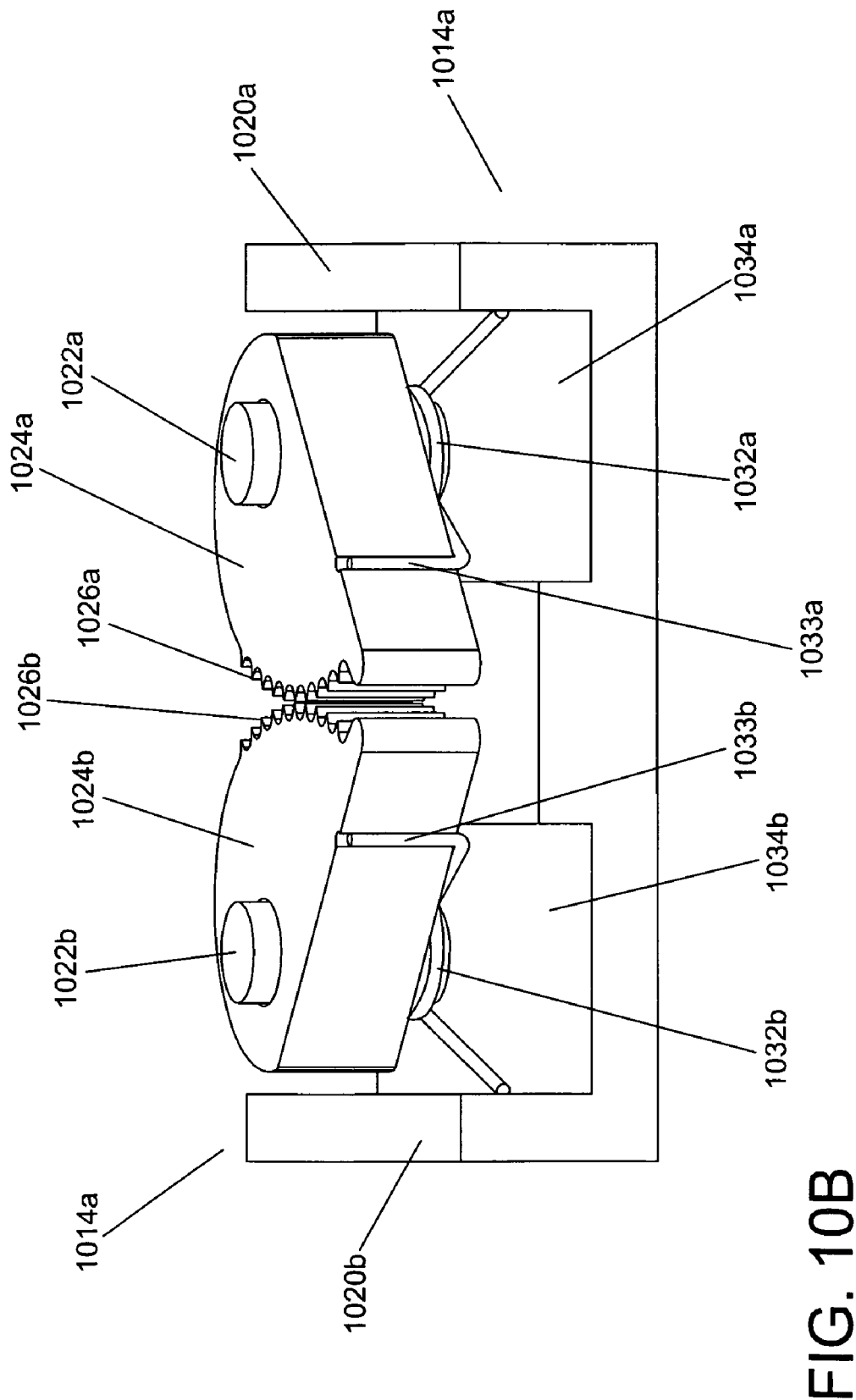
FIG. 10B shows an illustration of an embodiment of a unit for a gripping mechanism for a trimmer head according to the present invention.

FIG. 10B shows an illustration of an embodiment of unit 1014*a*. Unit 1014*a* may include ledges 1020*a* and *b*, pins 1022*a* and *b*, cleats 1024*a* and 1024*b*, jagged edges 1026*a* and *b*, springs 1032*a* and *b*, notches 1033*a* and *b*, and chambers 1034*a* and *b*. In other embodiments, unit 1014 may not have all of the elements listed and/or may have other elements instead of or in addition to those listed.

Chambers 1034*a* and *b*, ledges 1020*a* and *b*, pins 1022*a* and *b*, cleats 1024*a* and 1024*b*, and jagged edges 1026*a* and *b* were discussed in conjunction with FIG. 10A. However, FIG. 10B shows a clearer view of portions of cavities 1012*a* and *b*, ledges 1020*a* and *b*, pins 1022*a* and *b*, cleats 1024*a* and 1024*b*, and jagged edges 1026*a* and *b*. Springs 1032*a* and *b* are torsion springs that are wrapped around pins 1022*a* and *b*, respectively. One end of each of springs 1032*a* and *b* is bent up so as to fit into and engage notches 1034*a* and *b*, respectively. The opposite end of each of springs 1032*a* and *b* presses against the sides of ledges 1020*a* and *b*, respectively. Springs 1032*a* and *b* tend to unwind to a relaxed position. The unwinding of springs 1032*a* and *b* causes one end of each of springs 1032*a* and *b* to push into notches 1034*a* and *b* respectively and causes the other end of each of springs 1032*a* and *b* to push against ledges 1020*a* and *b*, respectively. The pushing of springs 1032*a* and *b* against ledges 1020*a* and *b* and into notches 1034*a* and *b* causes cleats 1024*a* and *b* to rotate into one another and if a trimmer line is located between cleats 1024*a* and *b*, the rotation causes cleats 1024*a* and *b* to clamp and/or grip the trimmer line. In one embodiment, the relaxed position is unobtainable, because cleats 1024*a* and *b* are configured such that cleats 1024*a* and *b* cannot rotate enough to allow springs 1032*a* and *b* to relax. In another embodiment, cleats 1032*a* and *b* are configured, such that the relaxed position is obtainable. In other words, the gripping of trimmer lines 110*a* and *b* may be accomplished by a torsion or extension spring (e.g., springs 1032*a* and *b*), a pivotal cam cleat (cleats 1024*a* and *b*), which are adapted to be received within the fore portions of chambers 1034*a* and *b*. One end of springs 1032*a* and *b* may be seated against and/or attached to adjacent walls (ledges 1020*a* and *b*) and the opposite ends of springs 1032*a* and *b* are seated in notches 1034*a* and *b* formed in cleats 1024*a* and *b*. The springs 1032*a* and *b* may be mounted to the undersides of cleats 1024*a* and *b* and aligned with corresponding apertures provided in unit 1014*a*. Using a trimmer head having bottom 1000, trimmer line 110*a* and *b* may be inserted into the trimmer head via the entrance ports without the use of a tool or a built-in manually operated actuator device, as long as springs 1032*a* and *b* are not too stiff. Additionally, trimmer lines 110*a* and *b* (FIG. 1) do not get stuck to cleats 1024*a* and *b* and may be removed without the assistance of tools.

Figure 10C:
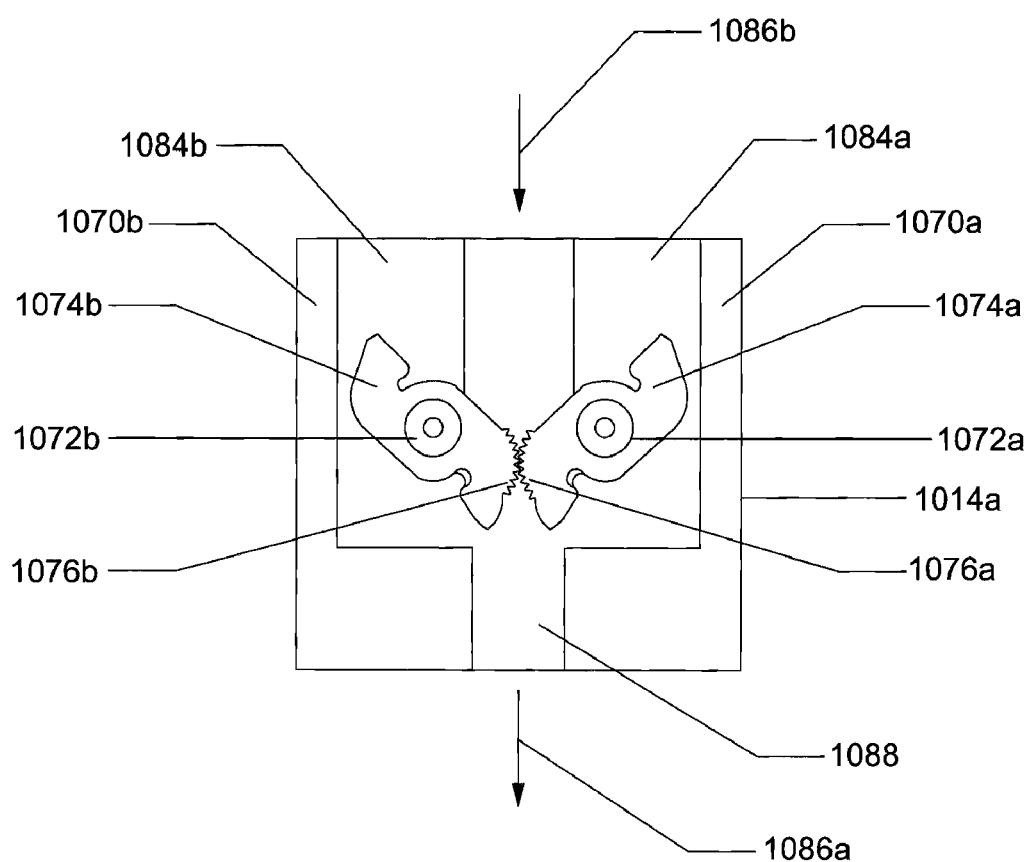
FIG. 10C shows an illustration of another embodiment of a unit for a gripping mechanism for a trimmer head according to the present invention.

FIG. 10C shows an illustration of another embodiment of unit 1014*a*. Unit 1014*a* may include ledges 1070*a* and *b*, pins 1072*a* and *b*, cleats 1074*a*, and *b*, jagged edges 1076*a* and *b*, chambers 1084*a* and *b*, arrows 1086*a* and *b*, and passageway 1088. In other embodiments, unit 1014*a* may not have all of the elements listed and/or may have other elements instead of or in addition to those listed.

Ledges 1070*a* and *b*, pins 1072*a* and *b*, cleats 1074*a* and *b*, jagged edges 1076*a* and *b*, chambers 1084*a* and *b* have essentially the same description as ledges 1020*a* and *b*, pins 1022*a* and *b*, cleats 1024*a* and 1024*b*, jagged edges 1026*a* and *b*, chambers 1034*a* and *b*, which were discussed above in conjunction with FIGS. 10*a* and *b*. Passageway 1088 has a similar description as passageway 705 (FIG. 7), for example, which was also discussed above. Arrows 1082*a* and *b* show the direction in which to insert the trimmer line, which is also the direction in which the trimmer line slides relatively unhindered.

In contrast to the embodiments of FIGS. 10*a* and *b*, cleats 1074*a* and *b* have their centers of gravity located in the center of pins 1072*a* and *b*, whereas cleats 1024 have their centers of gravity located elsewhere. Although not shown, optionally, a torsion spring biases cleats 1074*a* and *b* to close on trimmer line, similar to the torsion spring of FIG. 10B. The rotating cleats of this application may have their centers of gravity located in any location. While cutting vegetation, the centrifugal force does not dominate, and consequently, the location of the center of gravity does not have a significant affect on the gripping of the trimmer line. Prior to turning the trimmer head on, the springs and/or gravity will hold the trimmer line in place. When vegetation trimmer 100 is turned on, but not cutting vegetation, the centrifugal force on the trimmer line pulling the trimmer line out through the entrance ports may dominate and pull the cleats closed, clamping on the trimmer line and holding the trimmer line in place.

Figure 11:
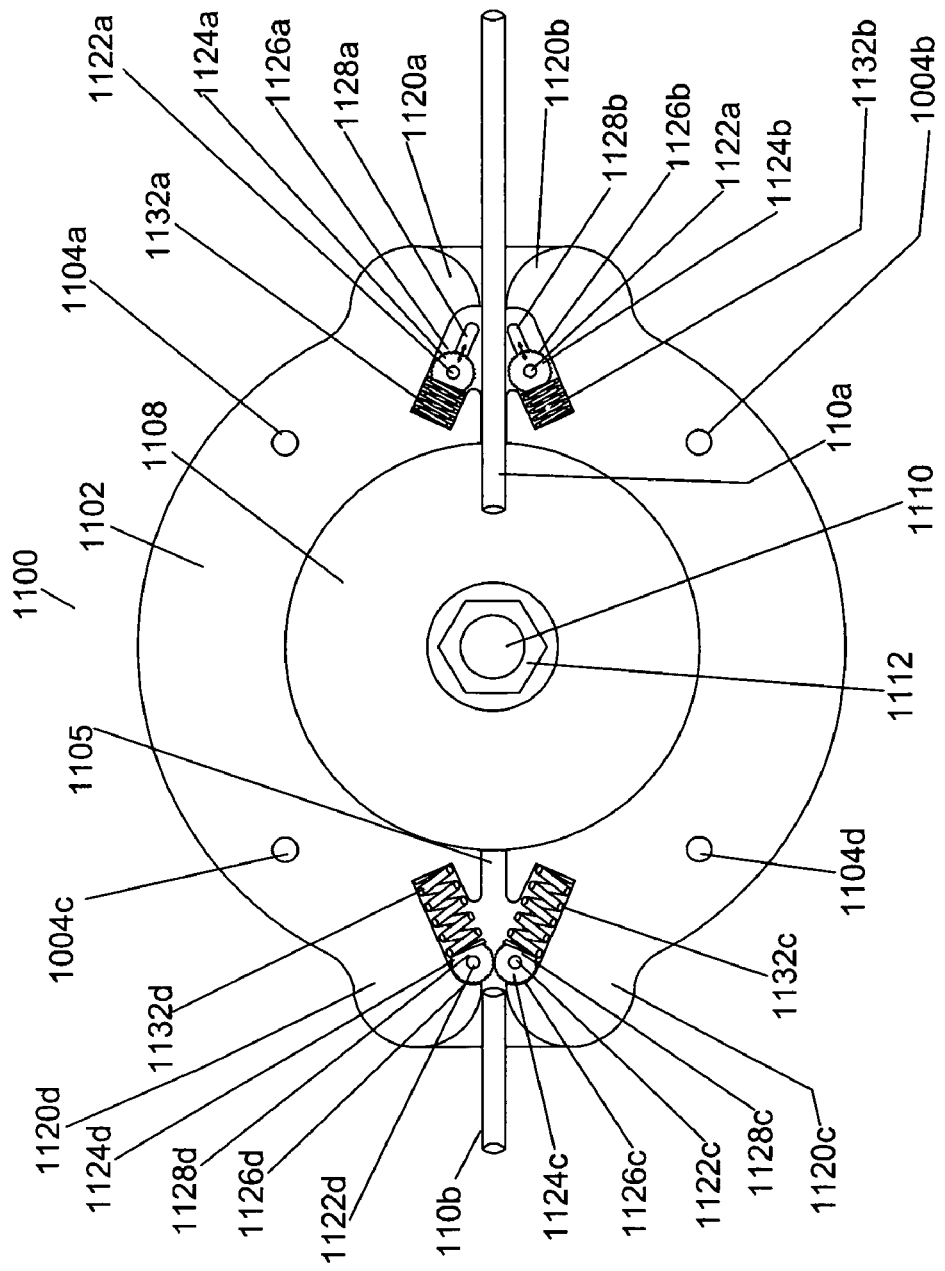
FIG. 11 shows an illustration of a top view of an example of a bottom of a trimmer head according to the present invention.

FIG. 11 is an illustration of a top view of an example of bottom 1100 of trimmer head 108. Bottom 1100 may include cover 1102, passageway 1105, hub 1108, hole 1110, impression 1112, walls 1120*a-d*, pins 1122*a-d*, cleats 1124*a-d*, optional jagged surface 1126*a-d*, slots 1128*a-d*, and springs 1132*a-d*. In other embodiments, bottom 1100 may not have all of the elements listed and/or may have other elements instead of or in addition to those listed.

Cover 1102, hub 1108, hole 1110, impression 1112, are similar to cover 502, hub 508, hole 510, and impression 512 (FIG. 5). Walls 1120*a-d*, cleats 1124*a-d*, jagged surface 1126*a-d*, and lots 1128*a-d* may be similar to walls 520*a-d*, pins 522*a-d*, cleats 524*a-d*, jagged surface 526*a-d*, and slots 528*a-d* (FIG. 5). However, cleats 1124*a-d* are disks that have pins 1120*a-d*, which slide in slots 1128*a-d*. In other words, although pins 522*a-d* are attached to trimmer head 500 and slots 528*a-d* are located in cleats 524*a-d*, pins 1122*a-d* are attached to cleats 1124*a-d* and slots 1128*a-d* are formed in bottom 1100. Also, cleats 1124*a-d* may not have jagged edges.

Figure 12:
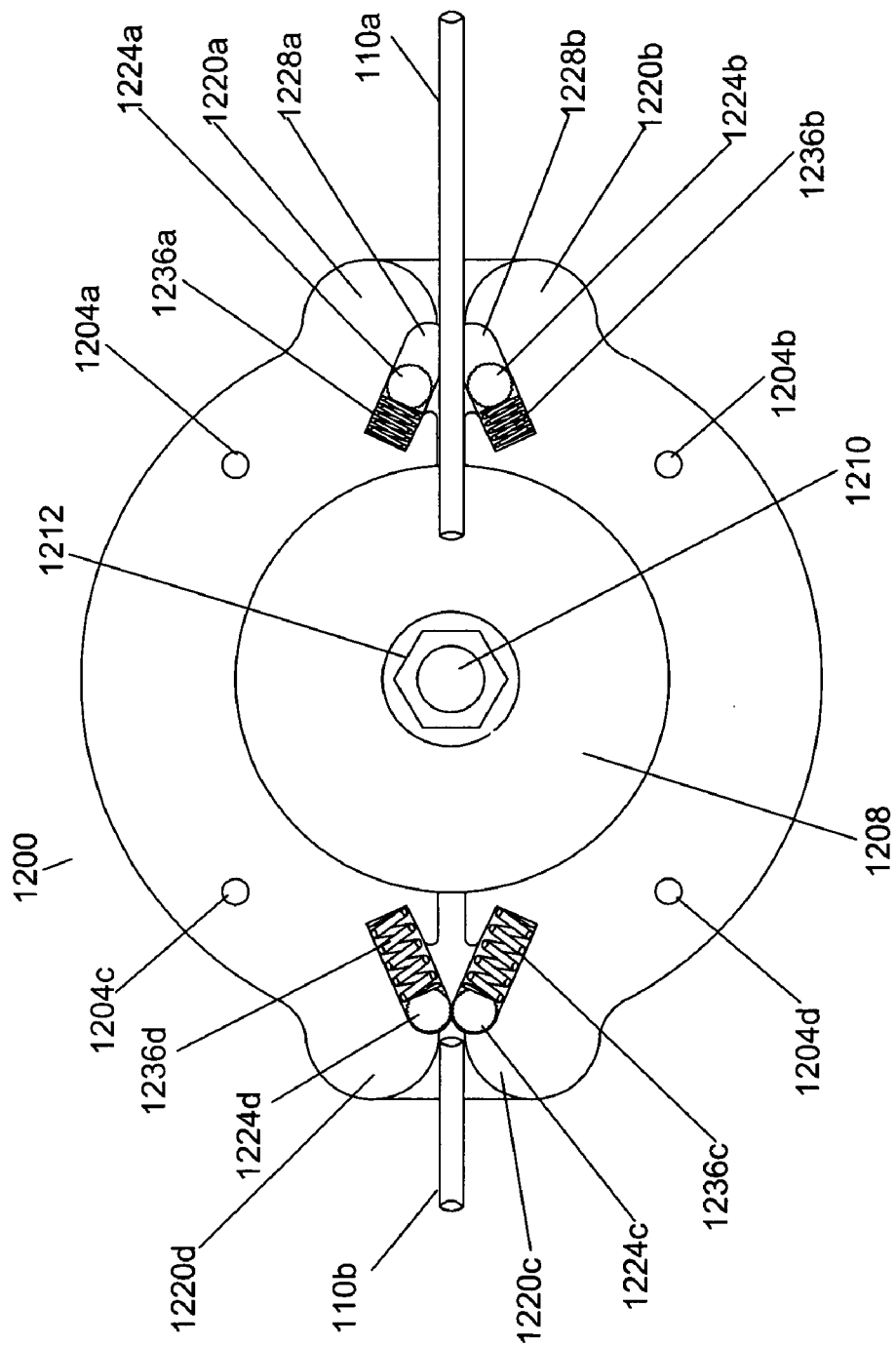
FIG. 12 shows an illustration of a top view of an example of a bottom of a trimmer head according to the present invention.

FIG. 12 is an illustration of a top view of an example of bottom 1200 of trimmer head 108. Bottom 1200 may include cover 1202, hub 1208, hole 1210, impression 1212, walls 1220*a-d*, cleats 1224*a-d*, optional jagged edges 1226*a-d*, slots 1228*a* and *d* and springs 1236*a-d*. In other embodiments, bottom 1200 may not have all of the elements listed and/or may have other elements instead of or in addition to those listed.

Hub 1208, hole 1210, impression 1212, are similar to hub 508, hole 510, and impression 512 (FIG. 5). Walls 1220*a-d*, cleats 1224*a-d*, optional jagged edges 1226*a-d*, slots 1228, and springs 1236*a-d* are similar to walls 520*a-d*, cleats 524*a-d*, jagged surface 526*a-d* (FIG. 5), slots 1128*a-d*, and springs 1132*a-d* (FIG. 11) and. However, cleats 1224*a-d* are disks that do not have pins. Also slots 1228*a* and *d* are wide enough to receive cleats 1224*a* and *b*, within which cleats 1224*a* and *b* slide. Cleats 1224*c* and *d* also slide in slots, but the slots are not labeled, because it would be difficult to distinguish a lead line that point to the slots of cleats 1224*c* and *d* from lead lines that point to the combination of cleats 1224c and d and springs 1236c and d. Although, since many of the above figures are somewhat crowded, the chambers and jagged edges associated with some of the cleats of some of the above embodiments are not labeled, all of the cleats sit in chambers and all cleats optionally may have jagged edges.

Although in the above embodiments the gripping mechanism is attached or built into the bottom of the trimmer head, in other embodiments the gripping mechanism could be built into the top of the trimmer head instead. The description of FIGS. 10A-12 describe bottoms of trimmer heads having different gripping units having different types of cleats. However, any of the gripping units may be constructed so as to be removable and/or rotating modules. Any of the different types of cleats may be used in stationary modules, removable modules, or units that are integral with the bottom and/or top of the trimmer head.

Figure 13:
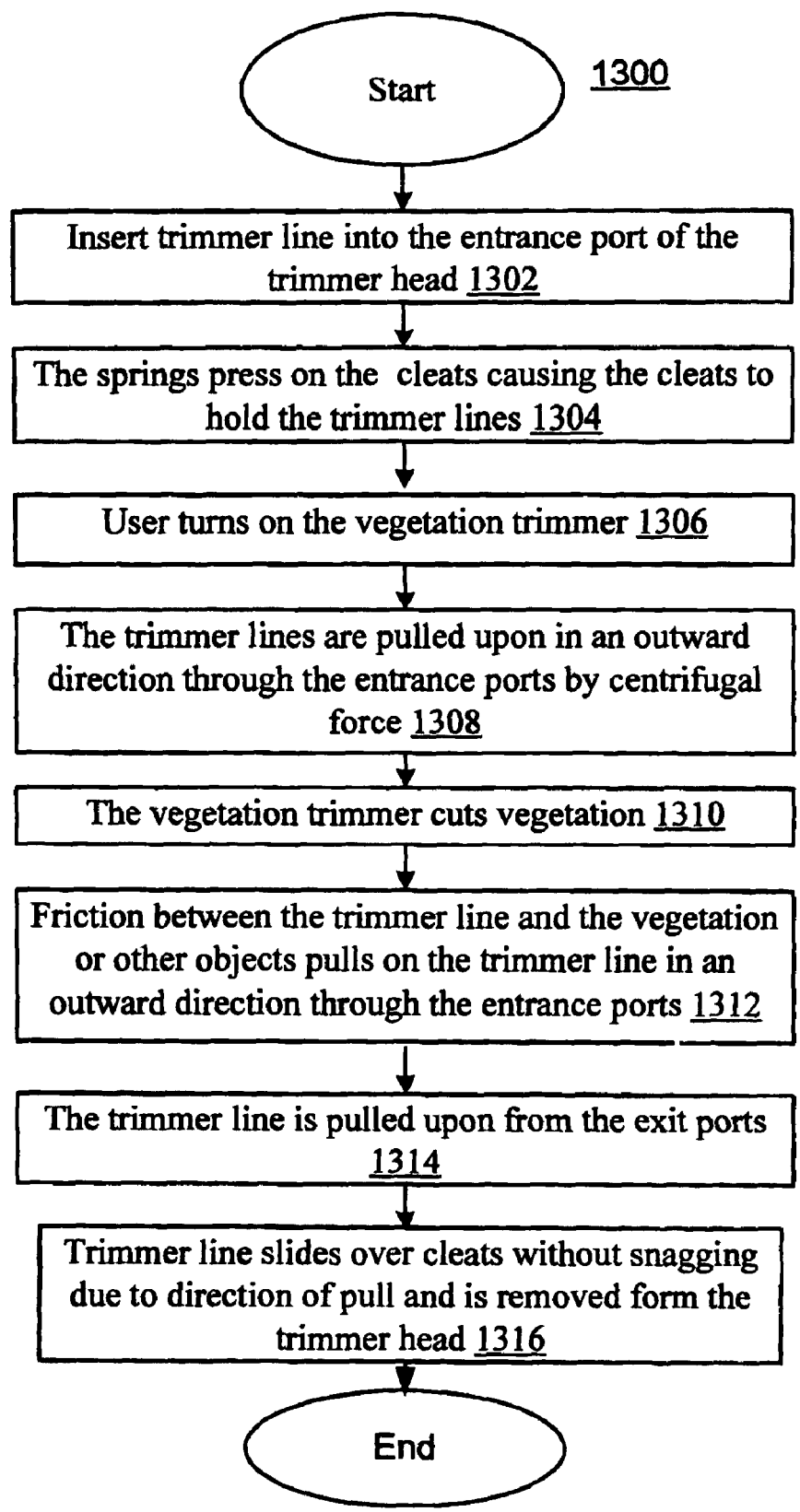
FIG. 13 is a flowchart of an example of a method of using a trimmer head according to the present invention.

FIG. 13 is a method 1300 of using trimmer head 108. In step 1302, trimmer lines 110a and b are inserted into trimmer head via entrance ports through a passageway to exit ports, such that enough of trimmer lines 110a and b stick out of the exit ports that the user can grab the exit port ends of the trimmer lines to pull the trimmer lines. The trimmer line slides over the cleats without getting snagged on the teeth of the cleats, because of the direction that the teeth are pointing. In step 1304, as a result of step 1302, the springs press cleats into the trimmer line, holding the trimmer line from sliding out through the entrance ports. In step 1306, the user turns on vegetation trimmer 100. In step 1308, as a result of step 1306, the trimmer line is pulled by the centrifugal force out through the entrance ports, which causes the cleats to tighten their grip on the trimmer lines 110a and b. In step 1310, the user uses vegetation trimmer 100 to cut vegetation. In step 1312, as a result of step 1310, as a result of friction from the trimmer line rubbing against the vegetation as the vegetation is cut, the pull on the trimmer line in the direction pointing out of the entrance ports increases, causing the cleats (and/or the teeth of cleats) to dig into the trimmer line. In step 1314, a determination is made to change at least one of the trimmer lines. Also, in step 1314, the user pulls on the ends of the trimmer lines located at the exit port. Prior to step 1314, the trimmer may be turned on and off and used many times for cutting vegetation. In step 1316, as a result of step 1314, the trimmer line slides over the cleats without getting snagged on the teeth of the cleats, because of the direction that the teeth are pointing.

Figure 14:
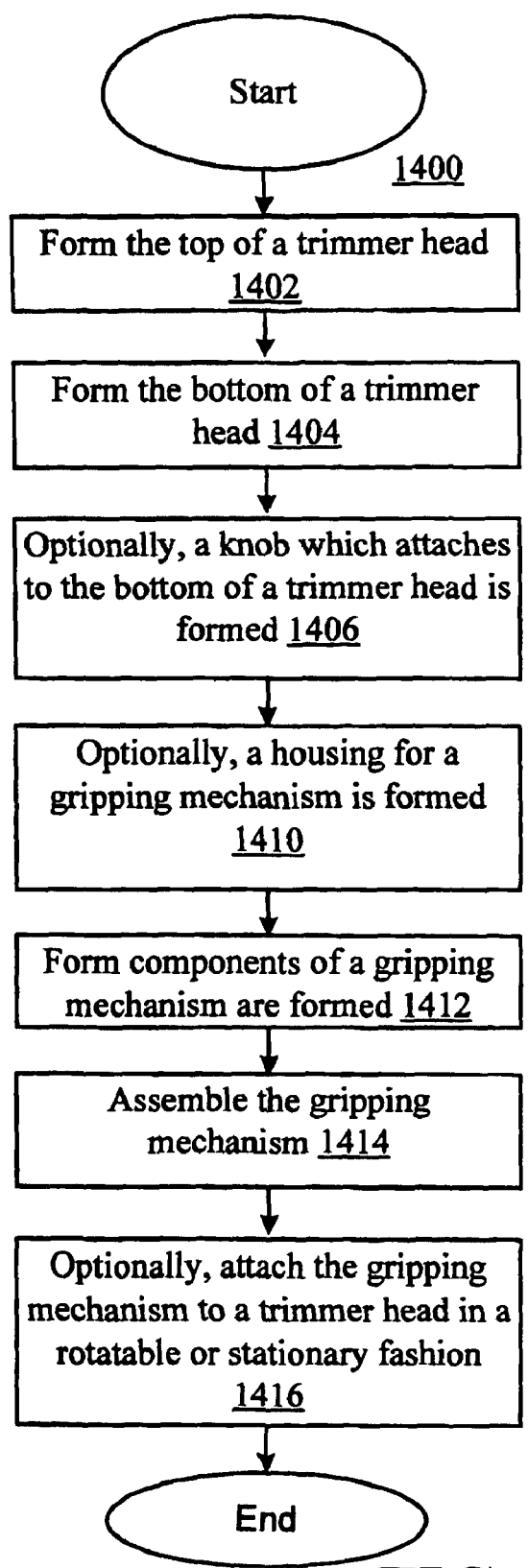
FIG. 14 is a flowchart of an example of a method of making a trimmer head according to the present invention.

FIG. 14 is a flowchart of an example of a method 1400 of making a vegetation trimmer 100 (FIG. 1). In step 1402, the top of trimmer head is formed, such as by injection molding. If trimmer head 108 is a top unloading head, the process of forming the top may include forming exit ports. The process of forming the top may include forming a central bore and forming one or more fastening structures for interlocking with the bottom of the trimmer head. Step 1402 may include forming fasteners in the top of the trimmer head that engage with the fasteners in the bottom of the trimmer head. Step 1402 may include forming a socket for receiving and engaging the driveshaft.

In step 1404, the bottom of trimmer head 108 (FIG. 1) is formed. If trimmer head 108 is a bottom unloading head, a trimmer head in the process of forming the bottom may include forming exit ports in the bottom. Step 1404 may involve forming a socket for the driveshaft. Step 1404 may include forming a chamber for a gripping mechanism and/or forming a chamber for each cleat of the gripping mechanism.

In optional step 1406, a knob is formed that attaches to the bottom of the trimmer head. In optional step 1410 a housing for the gripping mechanism is formed (step 1410 is not performed for embodiments in which the chambers that hold the cleats are molded into the trimmer head). Step 1410 may involve forming chambers for the cleats within the housing. Step 1410 may involve forming a wall for guiding the cleats while sliding and forming a wall on which a compression spring may push while pushing the cleats into a clamping configuration. Step 1410 may involve forming a wall with a lip for holding the cleat within the trimmer head. Step 1410 may involve forming a pin on which the cleat may rotate or slide. Step 1410 may involve forming a screw and/or hole for attaching the gripping mechanism to the trimmer head in a manner that allows the gripping mechanism to rotate or holds the gripping mechanism in a stationary configuration.

In step 1412 the components of the gripping mechanism are formed. Step 1412 may involve forming the cleats, which may involve forming a jagged edge on a portion of the cleats, and which may include one protrusion (e.g., tooth) that is longer than other protrusions or teeth. Step 1412 may involve forming springs, which may involve forming torsion or compression springs, depending on the embodiment. In step 1414, the gripping mechanism is assembled. Step 1414 may involve placing the cleats and springs into their chambers in a configuration that biases the cleats to close. In optional step 1416, the gripping mechanism is attached to the trimmer head in a rotatable or stationary fashion depending on the embodiment.

For embodiments in which chambers are formed in the bottom or top of the trimmer head, the components of the gripping mechanism are assembled within the top of the bottom of the trimmer head. For embodiments in which the gripping mechanism detaches from the trimmer head, the housing of the module is formed and the chambers are formed in the housing.

In this specification, many of the examples refer to pins of a first member that are received within holes or slots of a second member. However, new embodiments may be obtained by switching whether the first or second member has the pin or the hole or slot. For example, although FIG. 5 depicts pins 522a-d being attached to trimmer modules 514a and b and cleats 524a-d having slots 532a-d that slide on the pins of the modules 514a and b, in another embodiment, modules 514a and b may have slots that receive pins that are mounted on cleats 524a-d, so that the cleats have the pins and the modules have the slots (FIG. 5).

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A trimmer head device for rotating at least one segment of trimmer line in a predetermined plane of rotation, comprising:
   a housing having a top surface above said predetermined plane of rotation;
   a channel disposed within said housing, wherein said channel begins in said predetermined plane of rotation and bends vertically upward at an acute angle to said top surface;
   an entrance port for accessing said channel along said predetermined plane of rotation;

an exit port for accessing said channel at said top surface above said predetermined plane of rotation; and at least two cleats disposed within said housing along said channel;

springs that bias said at least two cleats into said channel, wherein said cleats automatically engage a segment of trimmer line within said channel as said segment of trimmer line is inserted into said channel through said entrance port, wherein said at least two cleats prevent movement of said segment of trimmer line in said channel toward said entrance port yet enable movement of said segment of trimmer line in said channel toward said exit port.

2. The device of claim 1, wherein each of said cleats has a jagged surface for engaging said segment of trimmer line.

3. The device of claim 1, wherein said jagged surface of each of said cleats are biased into said channel.

4. The device of claim 1, wherein said cleats are housed in a module that is removable from said housing.

5. The device of claim 1, wherein said cleats are housed in a module that rotates within said housing.

6. The device of claim 1, wherein said cleats are housed in a unit that is formed as part of said housing.

7. The device of claim 6, wherein the unit is molded into said housing.

8. The device of claim 1, wherein slots are formed within said housing and wherein each of said cleats is disposed within a slot and is reciprocally movable within said slot.

9. The device of claim 1, wherein each of said cleats rotates about a pivot.

10. The device of claim 1, wherein said spring is a compression spring.

11. The device of claim 1, wherein said spring is a torsion spring.

12. A trimmer head device for rotating at least one segment of trimmer line in a predetermined plane of rotation, comprising:

a housing having a top surface, a bottom surface, and a peripheral edge;

an entrance port located along said peripheral edge in said predetermined plane of rotation;

an exit port located on said top surface above said predetermined plane of rotation;

a channel extending between said entrance port and said exit port, wherein said channel begins at said entrance port in said predetermined plane of rotation and bends vertically upward at an acute angle of between ten degrees and eighty degrees to said exit port in said top surface, and wherein said entrance port, said exit port and said channel are sized to enable a segment of trimmer line to pass therethrough; and a gripping mechanism disposed within said housing along said channel that automatically engages said segment of trimmer line within said channel when said segment of trimmer line is inserted into said entrance port, said gripping mechanism having at least one cleat and at least one spring that biases said at least one cleat into said channel, wherein said gripping mechanism automatically prevents said segment of trimmer line from being retracted out of said channel toward said entrance port, and wherein said gripping mechanism enables said segment of trimmer line to move within said channel toward said exit port.

13. A trimmer head device for rotating at least one segment of trimmer line in a predetermined plane of rotation, comprising:

a housing having a top surface above said predetermined plane of rotation;

a channel disposed within said housing, wherein said channel begins in said predetermined plane of rotation and bends vertically upward at an acute angle to said top surface;

an entrance port for accessing said channel along said predetermined plane of rotation;

an exit port for accessing said channel at said top surface above said predetermined plane of rotation; and at least two cleats disposed within said housing along said channel;

springs that bias said at least two cleats into said channel, wherein said cleats and said springs are housed in a module that rotates within said housing, and wherein said cleats automatically engage a segment of trimmer line within said channel as said segment of trimmer line is inserted into said channel through said entrance port, wherein said at least two cleats prevent movement of said segment of trimmer line in said channel toward said entrance port yet enable movement of said segment of trimmer line in said channel toward said exit port.

\* \* \* \* \*